United States Patent [19]
Wang

[11] Patent Number: 5,987,171
[45] Date of Patent: Nov. 16, 1999

[54] PAGE ANALYSIS SYSTEM

[75] Inventor: Shin-Ywan Wang, Tustin, Calif.

[73] Assignee: Canon Kabushiki Kaisha, Tokyo, Japan

[21] Appl. No.: 08/338,781

[22] Filed: Nov. 10, 1994

[51] Int. Cl.$^6$ .................................................. G06K 9/36
[52] U.S. Cl. .......................................... 382/173; 382/226
[58] Field of Search .................................... 382/176, 173, 382/180, 226

[56] References Cited

U.S. PATENT DOCUMENTS

| | | | |
|---|---|---|---|
| 4,761,818 | 8/1988 | Bannai | 382/41 |
| 4,941,195 | 7/1990 | Tanaka et al. | 382/61 |
| 5,073,953 | 12/1991 | Westdijk | 382/176 |
| 5,086,346 | 2/1992 | Fujisawa | 382/176 |
| 5,278,918 | 1/1994 | Bernzott et al. | 382/176 |
| 5,335,290 | 8/1994 | Cullen et al. | 382/176 |
| 5,430,808 | 7/1995 | Baird et al. | 382/176 |
| 5,555,362 | 9/1996 | Yamashita et al. | 382/176 |
| 5,588,072 | 12/1996 | Wang | 382/176 |

FOREIGN PATENT DOCUMENTS

| | | | |
|---|---|---|---|
| 0017090 | 10/1980 | European Pat. Off. | G06K 9/32 |
| 0325417 | 7/1989 | European Pat. Off. | G06F 15/62 |
| 63-116569 | 5/1988 | Japan | H04N 1/41 |

OTHER PUBLICATIONS

O. Iwaki et al, "A Segmentation Method Based on Office Document Hierarchial Structure", Proceedings of the 1987 IEEE International Conference on Systems, Man, and Cybernetics, vol. 2, pp. 759–763.

T. Akiyama, et al., "Automated Entry System For Printed Documents", Pattern Recognition, vol. 23, No. 11, pp. 1141–1154, 1990.

O. Iwaki, et al., "A Segmentation Method Based On Office Document Hierarchical Structure", Proceedings of the 1987 IEEE International Conference on Systems, Man, and Cybernetics, vol. 2, pp. 759–763.

L. Fletcher, et al., "A Robust Algorithm For Text String Separation From Mixed Text/Graphics Images", IEEE Transactions on Pattern Analysis and Machine Intelligence, vol. 10, No. 7, Nov. 1988, pp. 910–918.

P. Bones, et al., "Segmentation of Document Images", SPIE Image Communication and Workstations 1990, vol. 1258, pp. 78–88.

J. Fisher, et al., "A Rule–Based System For Document Image Segmentation", IEEE Proceedings of 10th International Conference on Pattern Recognition, 1990, pp. 567–572.

K. Wong, et al., "Document Analysis System", IBM J. Res. Develop., vol. 26, No. 6, Nov. 1982, pp. 647–656.

Y. Tang, et al., "Document Analysis And Understanding: A Brief Survey", ICDAR, First International Conference on Document Analysis and Recognition, France, Sep. 30 –Oct. 2, 1991, pp. 17–31.

G. Nagy, et al., "A Prototype Document Image Analysis System For Technical Journals", Computer, Jul. 1992, pp. 10–22.

X. Hao, et al., "A Tool for Classifying Office Documents", Procedings of the 1993 Institute of Electrical and Electronics Engineers International Conference on Tools with AI , Nov. 8, 1993, pp. 427–434.

(List continued on next page.)

*Primary Examiner*—Andrew W. Johns
*Attorney, Agent, or Firm*—Fitzpatrick, Cella, Harper & Scinto

[57] ABSTRACT

A page analysis system which analyzes image data of a document page includes analysis of image data of one of a plurality of portions of the page, identification of a block of image data which has an association to another separate block of image data, and determination of whether or not picture information in the image data is half-tone line-drawing, joint-line, or unknown.

9 Claims, 18 Drawing Sheets

OTHER PUBLICATIONS

O. Iwaki, et al., "A Segmentation Method Based on Office Document Hierarchical Structure", *Proceedings of the 1987 Institute of Electrical and Electronics Engineers International Conference on Systems, Man, and Cybernetics,* vol. 2, Oct. 20–23, 1987, pp. 759–763.

G. Nagy, et al., "A Prototype Document Image Analysis System for Technical Journals", *Computer,* vol. 7, Jul. 1992, (13 pages).

S. Srihari, "Document Image Understanding", *1986 Proceedings Fall Joint Computer Conference,* Nov. 2–6, 1986, pp. 87–96.

Tsujimoto, et al., "Understanding Multi-articled Documents," 10th Int'l Conf. on Pattern Recognition, IEEE, vol. 1, Jun. 16–21, 1990, pp. 551–556.

Cordi, V. A., "Virtual Memory Hierarchy", *IBM Technical Disclosure Bulletin,* vol. 21, No. 10, Mar. 1979, pp. 4001–4004.

Inagaki, et al., "Macsym: A Hierarchical Parallel Image Processing System for Event–Driven Pattern Understanding of Documents", *Pattern Recognition,* vol. 17, No. 1, 1984, pp. 85–108.

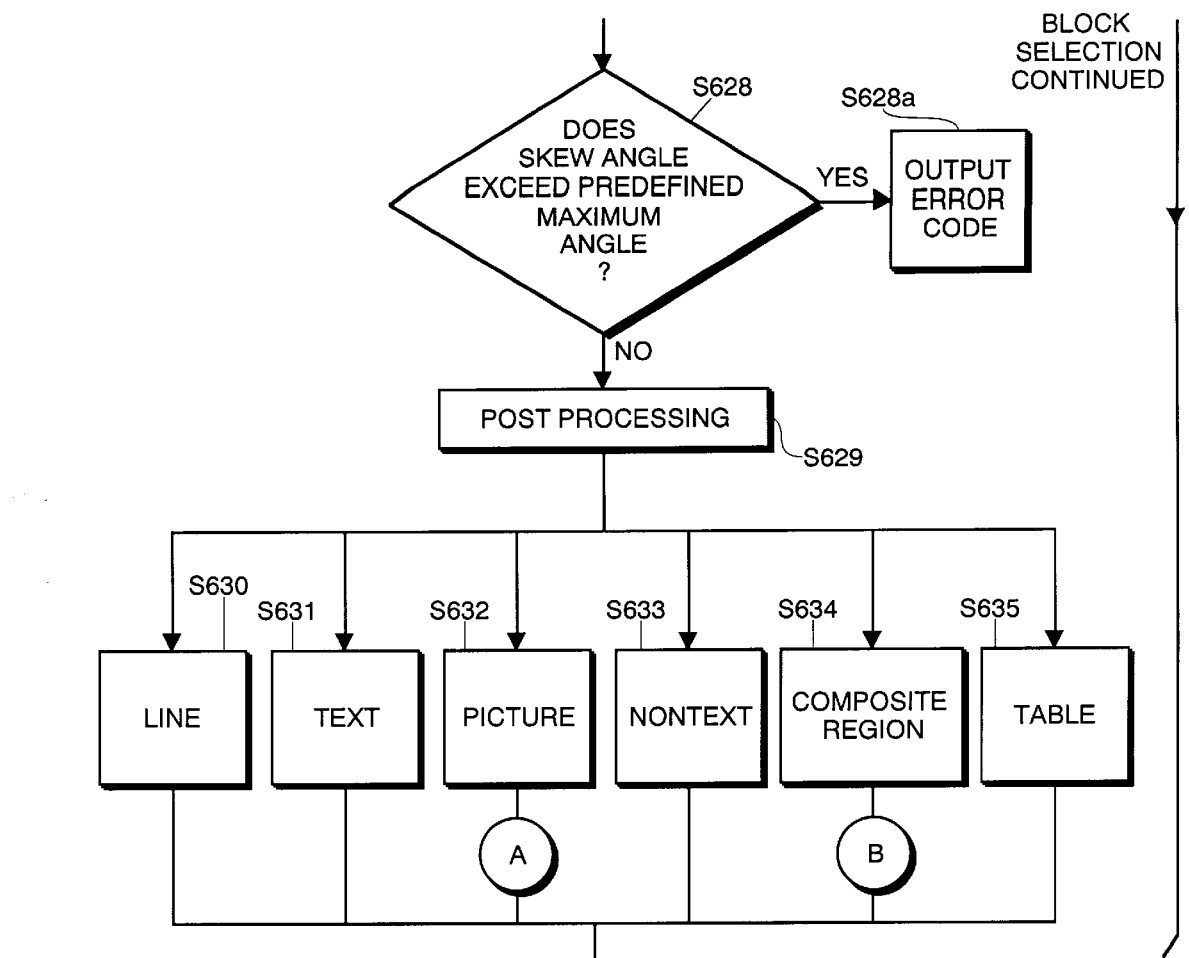
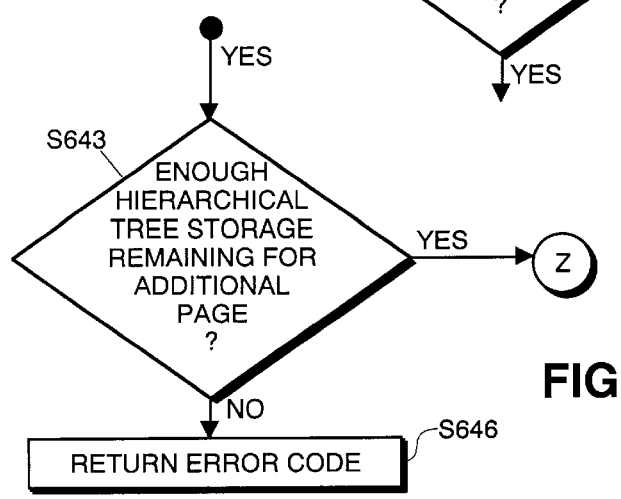
FIG. 6C
FIG. 6D

To:

From:

CC:

XXXXXXXXXXXXXXXXXXXXXXXXXXXXXXXXXXXX
XXXXXXXXXXXXXXXXXXXXXXXXXXXXXXXXXXXX

XXXXXXXXXXXXXXXXXXXXXXXXXXXXXXXXXXXX
XXXXXXXXXXXXXXXXXXXXX

FIG. 16

PAGE ANALYSIS SYSTEM

INCORPORATION BY REFERENCE

U.S. application Ser. No. 07/873,012, "Method And Apparatus For Character Recognition" and Ser. No. 08/171,720, "Method And Apparatus For Selecting Text And/Or Non-Text Blocks In A Stored Document", are both incorporated herein by reference.

BACKGROUND OF THE INVENTION

1. Field Of The Invention

The present invention relates to a page analysis system for analyzing image data of a document page utilizing block selection, and particularly to such a system in which, prior to block selection, various parameters of the block selection application are designated, such as document type, memory space, document portion to be analyzed, etc. As a result, block selection processing is more accurate.

2. Description of The Related Art

Recently developed block selection techniques, such as the techniques described in the aforementioned U.S. patent application Ser. Nos. 07/873,012 and 08/171,720, are used in page analysis systems to provide automatic analysis of images within a document page in order to distinguish between different types of image data within the document page. The result of such a block selection technique is used to determine the type of subsequent processing to be performed on the image, such as optical character recognition (OCR), data compression, data routing, etc. For example, image data which is designated as text data will be subjected to OCR processing, whereas image data which is designated as picture data would not be. subjected to OCR processing. As a result, different types of image data can be input and automatically processed without an operator's intervention.

An example of how a block selection technique operates, such as the ones referenced above, will be discussed below with respect to FIGS. 1–3.

FIG. 1 shows the page of a representative document. Document page 101 is arranged in a two-column format. The page includes title 102, horizontal line 104, text areas 105, 106 and 107, which include lines of text data, halftone picture area 108, which includes a graphic image which is non-text, table 110, which includes text information, framed area 116, halftone picture area 121 accompanied by caption data 126, and picture areas 132 and 135 accompanied by caption data 137.

According to the block selection techniques described in Ser. Nos. 07/873,012 and 08/171,720, each area of document page 101 is designated in accordance with a type of image data obtained therein and image data is then segmented based on its respective type. As the block selection application processes the document page, a hierarchical tree structure is created as shown in FIG. 2.

In FIG. 2, hierarchical tree structure 200 contains a plurality of nodes which represent segmented blocks of image data. Each node of the tree contains feature data which defines the feature of each block of image data in the processed document page. For example, the feature data may include block location data, size data, attribute data (image type, such as text, picture, table, etc.), sub-attribute data, and child node and parent node pointers. In the present invention, child or "descendent" nodes represent image data which exist entirely within a larger block of image data. Child nodes are depicted in the hierarchical tree structure as a node branching from a parent node, such as the nodes at the same level as node 211, which branch from parent or root node 201. In addition to the feature data described above, a node which represents a text block may also contain feature data defining the block's reading orientation and reading order.

Once a hierarchical tree structure, such as hierarchical tree structure 200, has been created, it is stored in memory. Upon receiving a request to process the image data in the document image, hierarchical tree structure 200 is retrieved from memory and image data which has been blocked together is processed according to the feature data stored in its corresponding node.

In addition to using the hierarchical tree structure to process image data of a document page, the hierarchical tree structure is used to generate and display a comprehensible format of document page 101, such as the display of block template 301 on display 300 which is shown in FIG. 3. Block template 301 of the document page is generated and displayed to the user based on the feature data stored in the hierarchical tree structure shown in FIG. 2.

The block template of the document page directly reflects the structure of the hierarchical tree as well as the feature data stored in each node of the hierarchical tree structure. The feature data in the node is utilized to generate the block outline, location, and size. In addition, feature data in each node is used to identify the type of image data contained within the block and, if appropriate, reading order and reading orientation. For example, as shown in FIG. 3, block template 301 includes text blocks 302, 304, 305 and 309, each of which corresponds to nodes 202, 204, 205 and 209, respectively. As shown, each text block includes feature data which designate the block as text and also define a block's reading order and reading orientation.

In the foregoing block selection techniques, difficulties have been encountered. For example, erroneous block selection processing of text data results in poor OCR processing. Also erroneous processing of joint-lines (lines which are connected at a 90° angle, and which do not form a frame) creates problems when extracting image data to be processed. Moreover, the previously discussed block selection techniques do not inform the user of application errors which inhibit block selection, such as "out-of-memory" or "page skew too large". There is, therefore, a need to provide a block selection application which includes features to address the foregoing problems.

SUMMARY OF THE INVENTION

The page analysis system according to the present invention analyzes image data in a multi-page document. The system includes a first memory area utilized for receiving and storing input image data of one page of the multi-page document and for processing the image data of one page in accordance with a block selection application, and a second memory area for receiving and for storing the results of the processed page stored in the first memory area. An out-of-memory indicator is output by allocating, in the first memory area, memory space for storing input image data of a page to be analyzed, allocating, in the second memory area, memory space for storing a plurality of process results of block selection, and outputting a first error code in the case the image data of the one page of the multi-page document to be analyzed exceeds the memory space allocated in the first memory area, and outputting a second error code in the case no additional memory space is available to store the results of block selection in the second memory area.

In another aspect of the present invention, a page analysis system analyzes image data in a document page, and selects at least one portion of the document page to be analyzed. The document page is displayed utilizing the input image data, then coordinates of at least one portion of the document page to be analyzed are designated, using a coordinate designation device. Image data within the designated portion of the document page is then extracted and block selection on the extracted portion is performed to analyze the image data within the at least one portion.

In another aspect of the present invention, a page analysis system analyzes image data of a document page in at least one designated direction. Image data of a document page is input and directional information of the image data in the document page is received. It is then determined whether directional information has been received. In the case that it has been determined that directional information has been received, the direction designated by the received directional information is then analyzed. In the case that directional information has not been received, the document page is analyzed in a predefined default direction.

In another aspect of the present invention, a page analysis system inputs image data of a document page to be analyzed, commences block selection processing which includes a calculation of the skew angle of the page, compares the calculated skew angle to a predefined maximum skew angle, and determines whether the calculated skew angle is greater than the predefined maximum skew angle. In the case that the skew angle does not exceed a predefined maximum skew angle, block selection is completed, and, in the case that the skew angle exceeds the predefined skew angle, block selection is terminated.

In another aspect of the present invention, a page analysis system inputs image data of a page of a multi-page document, identifies and separates image data into blocks having the same image type, and identifies at least one block of image data which has an association to another separate block of image data. According to this aspect of the invention, associated blocks of image data are combined within a composite block, for example, a composite block representative of a figure and its caption, and the composite block is represented in the hierarchical tree as a root node having descendent nodes which represent each of the associated blocks of image data.

In another aspect of the present invention, a page analysis system inputs image data of a page of a multi-page document, identifies and separates image data into blocks having the same image type, and identifies blocks of image data which contain picture information. According to this aspect of the invention, the type of picture information within the block of picture information is recognized to be a halftone image, a line drawing, a joint line, or an unknown picture type. The recognized type of picture is stored in a node representing a block of picture information in the hierarchical tree.

This brief summary of the invention has been provided so that the nature of the invention may be understood quickly. A more complete understanding of the invention and its advantages may be obtained by reference to the following detailed description in connection with the appended drawings.

BRIEF DESCRIPTION OF THE DRAWINGS

FIGS. 6A–6D comprise a flowchart showing the method for performing page analysis utilizing the block selection technique of the present invention;

FIG. 16 is a view of a standard document used in explaining text extraction from the document.

DETAILED DESCRIPTION OF THE PREFERRED EMBODIMENT

Figure 4:
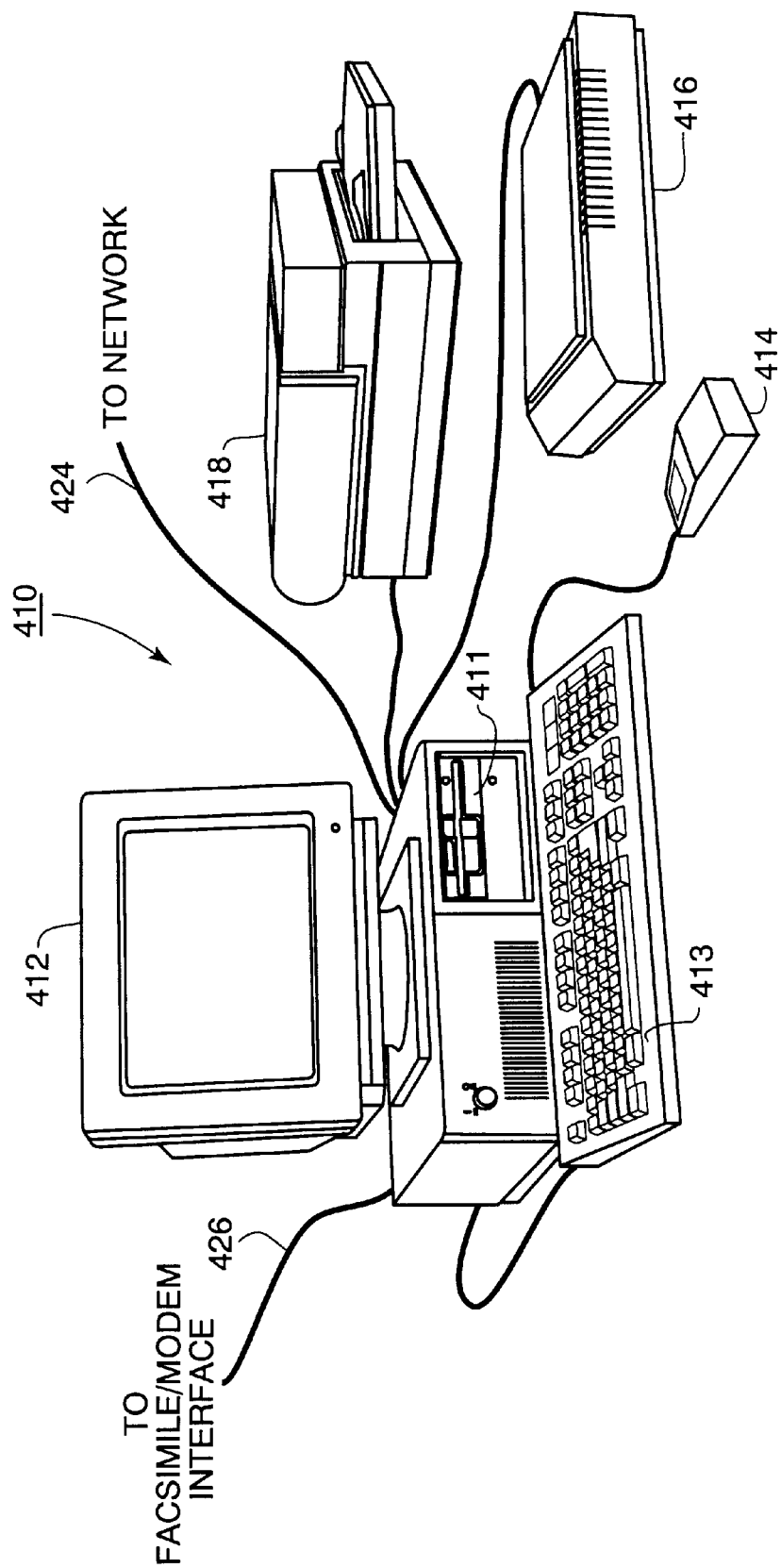
FIG. 4 is a perspective view showing the outward appearance of an apparatus according to the present invention.

FIG. 4 is a view showing the outward appearance of a representative embodiment of the invention. Shown in FIG. 4 is computing equipment 410, such as a MacIntosh or an IBM PC or PC compatible computer having a windowing environment, such as Microsoft Windows. Provided with computing equipment 410 is display screen 412, such as a color monitor, keyboard 413 for entering user commands, and pointing device 414, such as a mouse for pointing to and for manipulating objects displayed on screen 412.

Computing equipment 410 includes a mass storage device such as computer disk 411 for storing data files which include document image files, in either compressed or uncompressed format, and for storing application program files which includes the block selection application of the present invention. Also stored in disk 411 are various hierarchical tree structure data for each document page which has been subjected to the block selection application.

The multi-page document is input by scanner 416 which scans each page of the document or other images and provides bit map image data of those pages to computing equipment 410. The image data may also be input into computing equipment 410 from a variety of other sources such as network interface 424 or other external devices via facsimile/modem interface 426. Printer 418 is provided for outputting process document images.

It should be understood that, although a programmable general purpose computer arrangement is shown in FIG. 4, a dedicated or stand alone computer or other type of data processing equipment can be used to practice the present invention.

Figure 5:
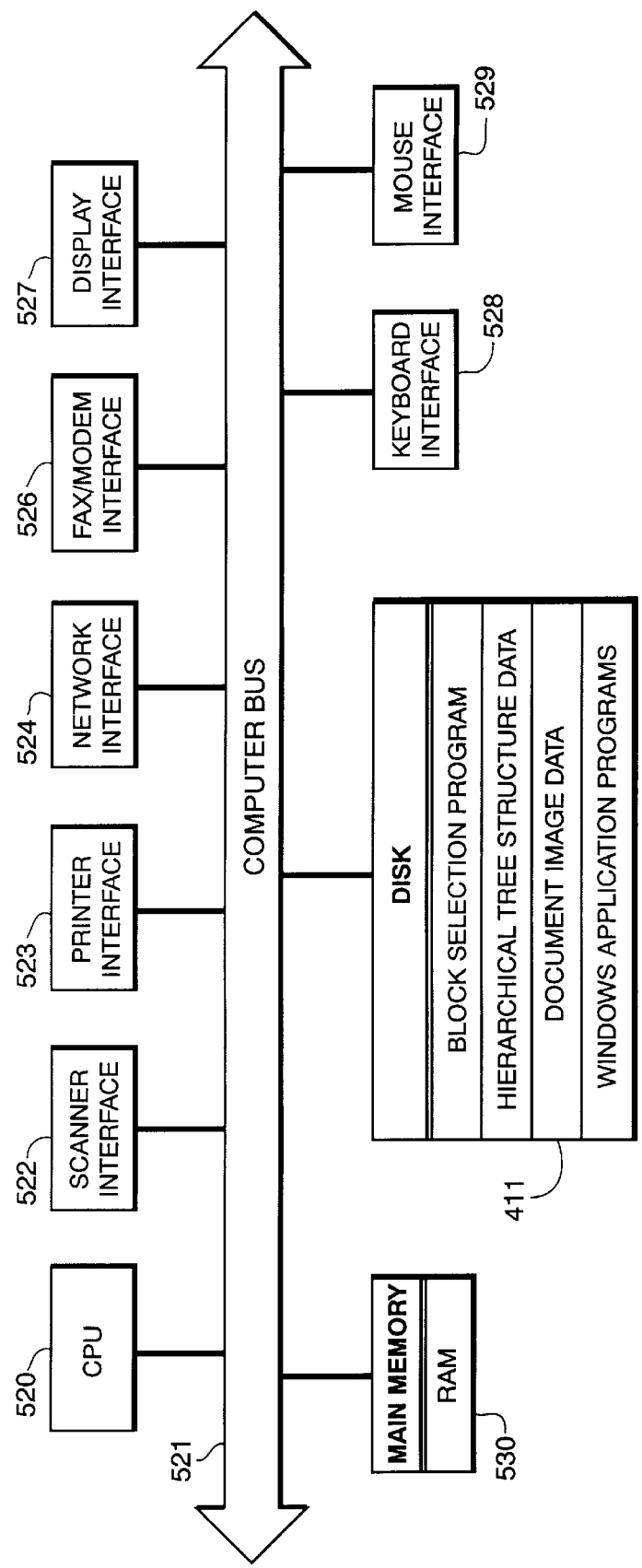
FIG. 5 is a block diagram of the FIG. 1 apparatus.
Figure 6A:
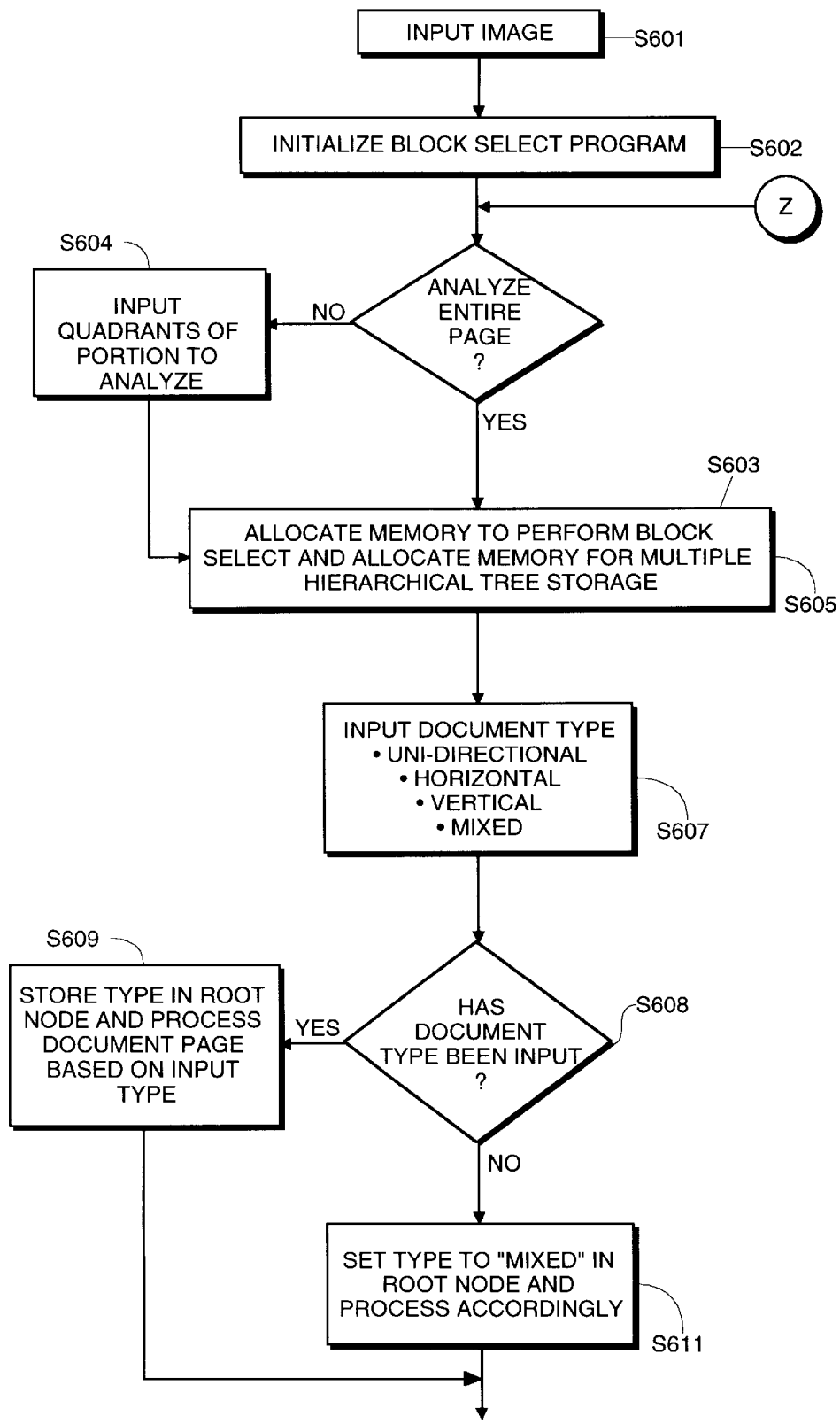
Figure 6B:
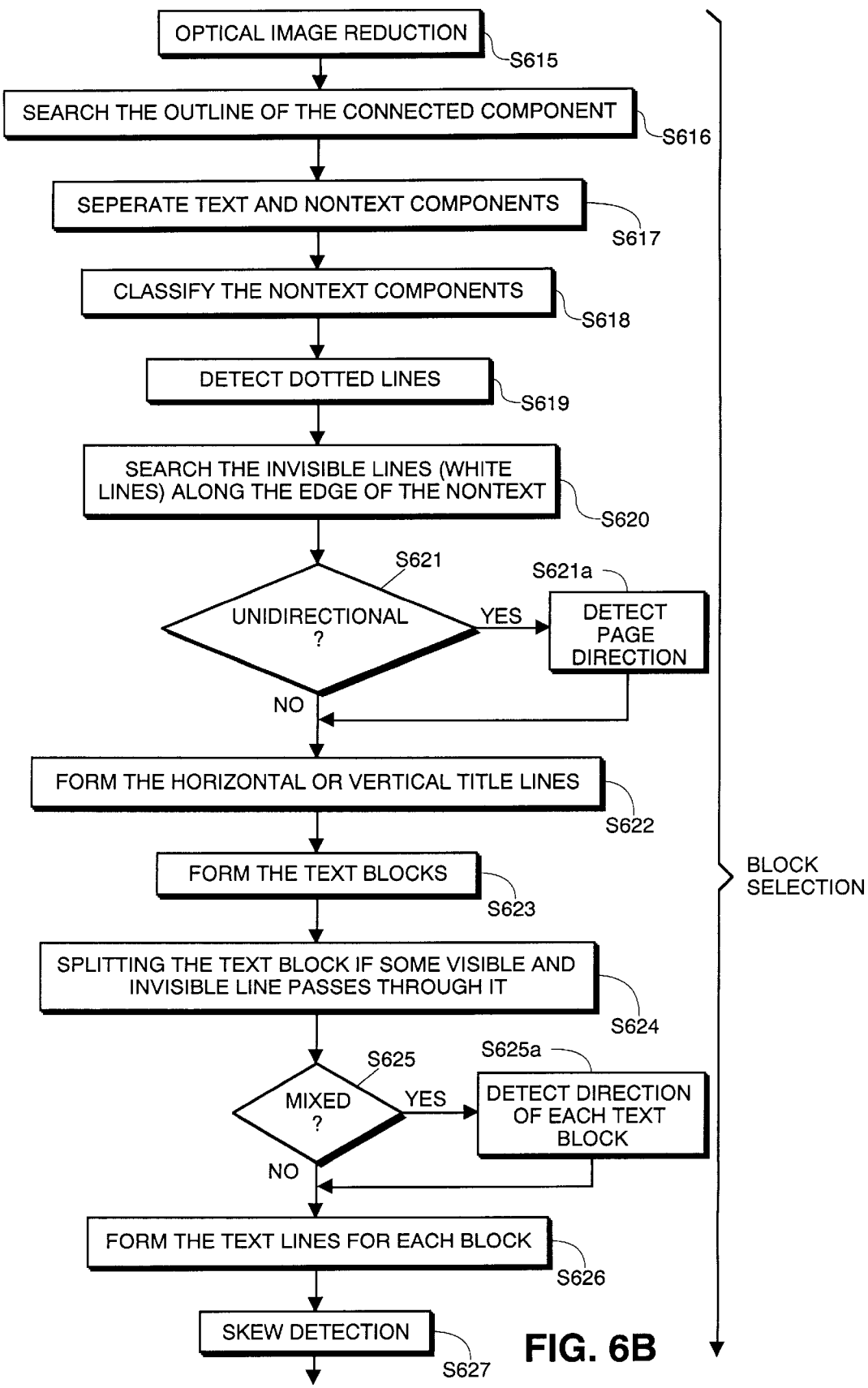

FIG. 5 is a detailed block diagram showing the internal construction of computing equipment 410. As shown in FIG. 5, computing equipment 410 includes a central processing unit (CPU) 520 interfaced with computer bus 521. Also interfaced with computer bus 521 is scanner interface 522, printer for interface 523, network interface 524, fax/modem interface 526, display interface 527, keyboard interface 28, mouse interface 529, main memory 530, and disk 411.

Main memory 530 interfaces with computer bus 521 so as to provide random access memory storage for use by CPU 520 while executing stored process steps such as process steps in the block selection application. More specifically, CPU 520 loads those process steps from disk 411 into main memory 530 and executes those stored process steps out of main memory 530.

In accordance with a user's instructions, stored application programs provide for image processing and manipulating of data. For example, a desktop processing program, such as Wordperfect® for Windows, may be activated by an operator to create, manipulate, and view documents before and after block selection has been applied. Likewise, a page analysis program may be executed to run a block selection operation to analyze various types of image data in an input document page and to display the results of the page analysis to an operator via a windowing environment.

FIGS. 6A–6D comprise a flowchart showing the method for performing page analysis utilizing the block selection application according to the present invention. The process steps shown in FIGS. 6A–6D are executed by CPU 520 in accordance with a computer program stored in disk 411.

In step S601, pixel image data is input into the system and is stored in disk 411. Image data is a pixel-by-pixel representation of the image. Preferably, the pixel data is binary pixel data, that is, black and white image data. But it is possible for the image data to be halftone image data, in which each pixel is represented by one of. plural grey scale levels, or for the image data to be color image data in which each pixel is represented by a multi-bit word which encodes the color for the pixel. In such cases, or in any other case where the pixel data is not binary pixel data, then threshold processing should be performed so as to convert the non-binary pixel data into binary pixel data prior to storage in disk 411.

Thus, in step S602, the block selection application is initialized by setting the various internal variables which are utilized by the block selection application and parameters. In step S603, the user is queried as to whether the entire input document page is to be analyzed utilizing the block selection application. If only a portion of the document page is to be analyzed, in step S604, the user inputs the coordinates of the portion to be analyzed.

The method of designating at least one portion to be analyzed of the document page (step S604) will be discussed below in greater detail with respect to FIGS. 7A and 7B.

Figure 7A:
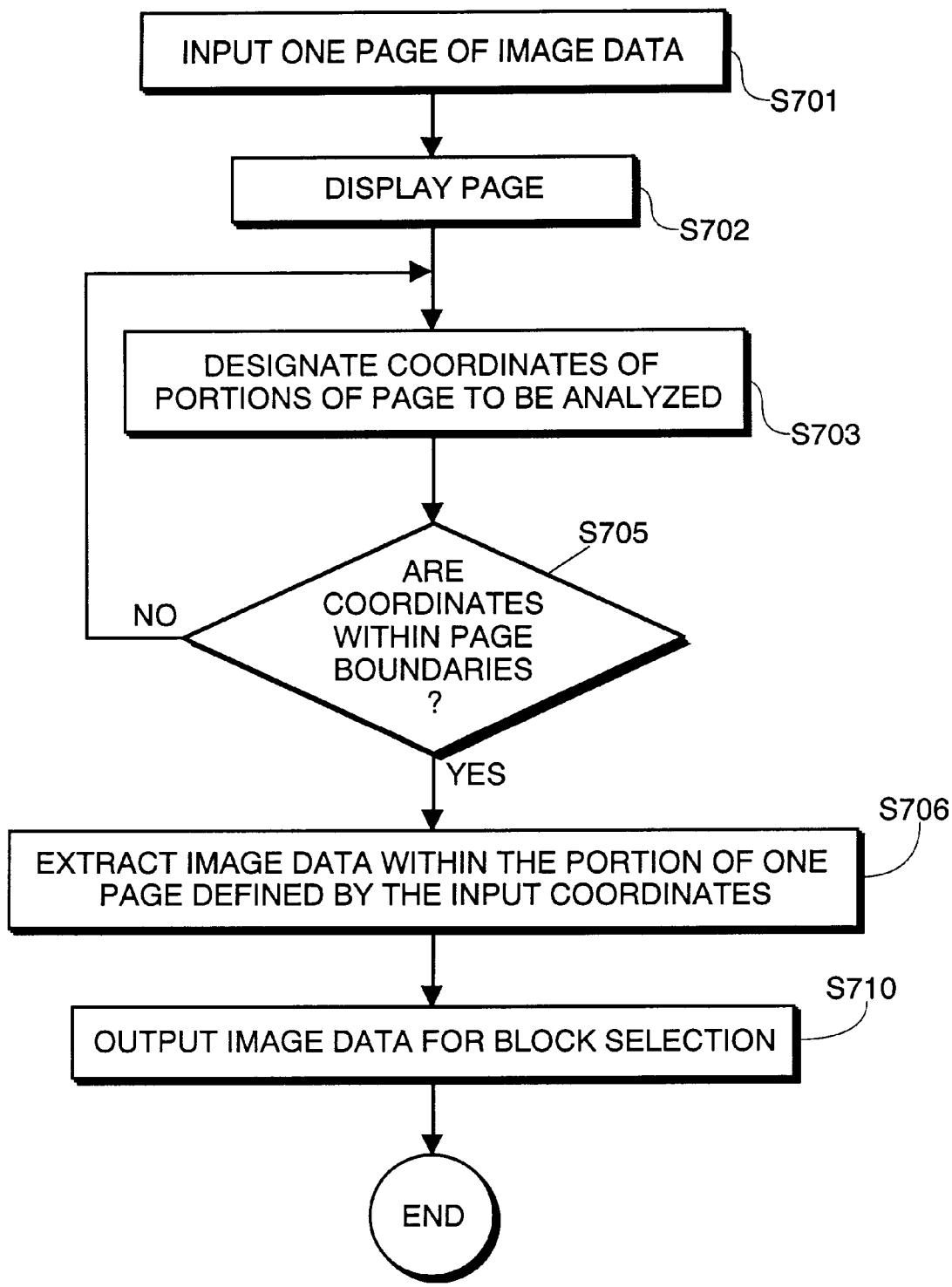
FIG. 7A is a flow chart describing the method of designating a portion to be analyzed of the input document page.
Figure 7B:
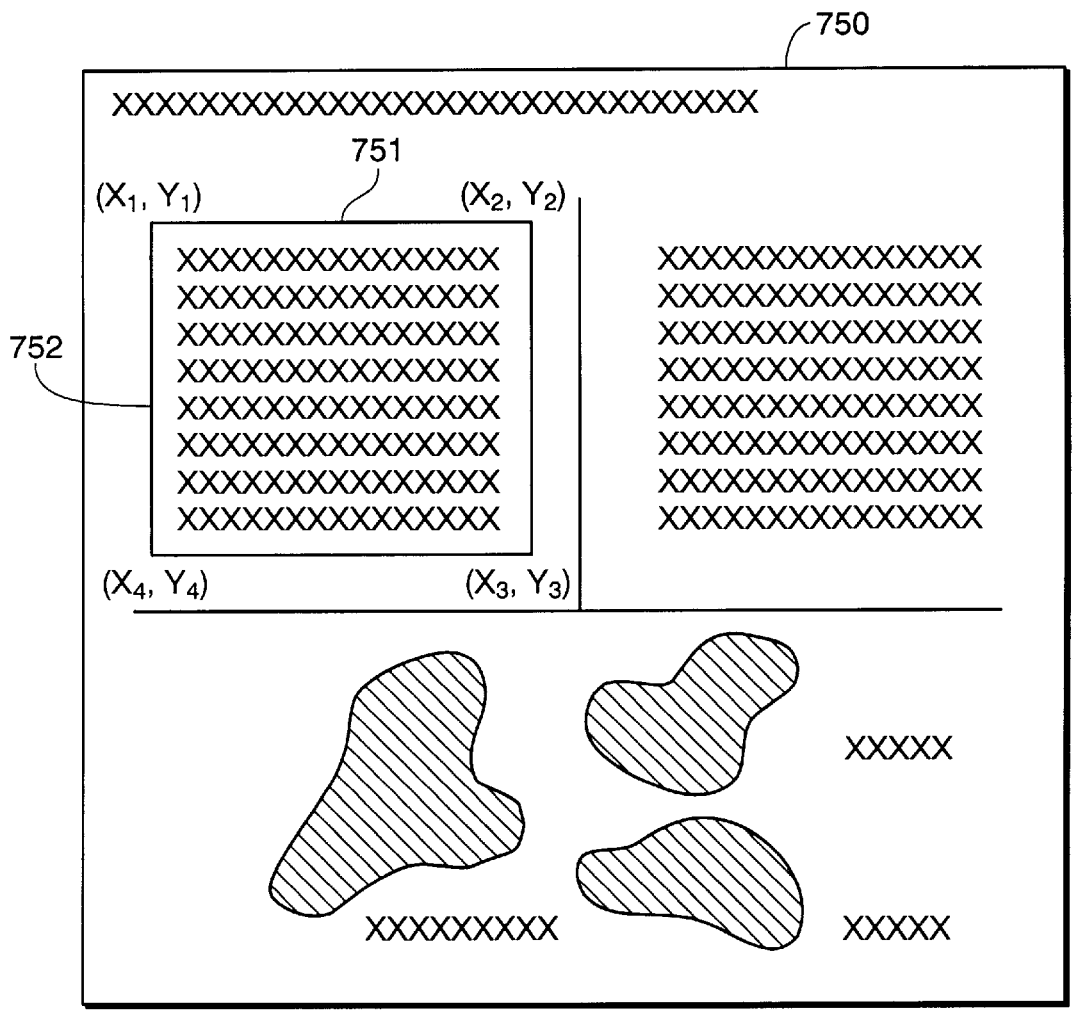
FIG. 7B is a representational view of the portion of the document page which has been designated for page analysis.

FIG. 7A is a detailed flow diagram for selecting a portion of a page to be analyzed. In step S701, a page of image data is input. For example, as shown in FIG. 7B, document page 750 is input and the image data resulting therefrom is stored in disk 411. In step S702, the input page of image data is retrieved from disk 411 and is displayed to the user.

In step S703, the user is requested to input x-y coordinates of a portion of the input page to be analyzed. For example, in order to analyze text portion 751 in page 750, a user must input coordinates $(x_1, y_1), (x_2, Y_2), (X_3, y_3)$, and $(X_4, y_4)$. In step S705, after the user has input the coordinates, the page analysis program determines whether the coordinates input in step S703 are within the boundaries of the input page. For example, as shown in FIG. 7B, it is determined in step S705 whether the input coordinates are within the boundaries of page 750. If it is determined that the input coordinates are not within the boundaries of the input page, then the flow returns to step S703. This process is repeated until a user inputs coordinates which are within the boundaries of the input page, or until the user indicates that the entire page is to be analyzed. If, on the other hand, it is determined that the coordinates are within the boundaries of the input page, then the flow proceeds to step S706.

In step S706, image data within the portion of the input page defined by the input coordinates is extracted. The extracted image data is then subjected to block selection in step S710, and flow returns to step S605.

In the event that the entire document page is to be analyzed, or after page portion selection in step S604, flow advances to step S605. In step S605, memory is allocated to perform block selection for either the entire page or for the portion of the page designated in step S604. In addition to allocating memory to perform block selection, memory to store the resulting hierarchical tree structure for the analyzed page is allocated as well.

The manner by which memory is allocated in step S605 will be described in greater detail below with respect to FIG. 8.

Figure 8:
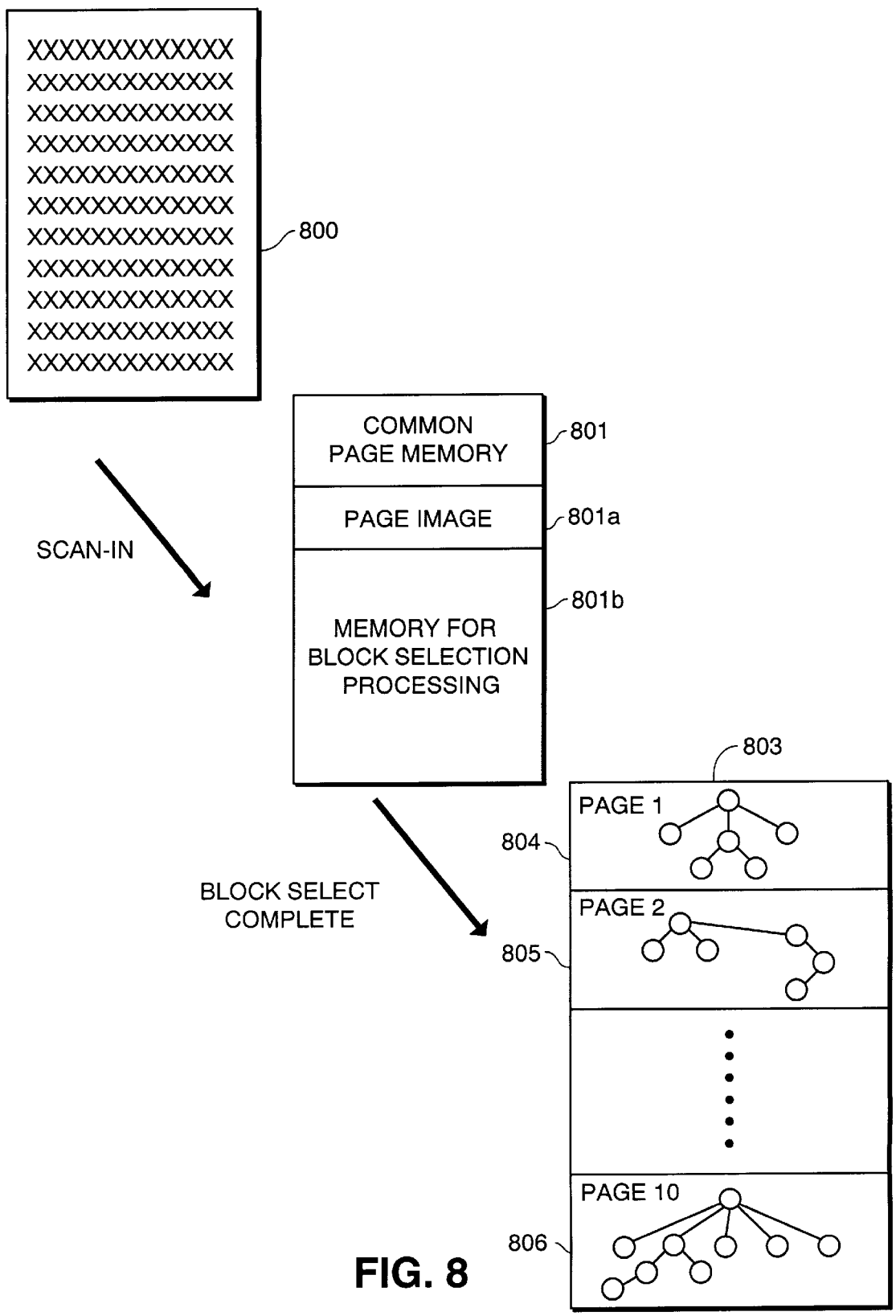
FIG. 8 is a pictorial representation of the manner of allocating memory space for page analysis.

FIG. 8 shows a pictorial representation of memory allocated to perform block selection, and of memory allocated for multiple hierarchical tree storage. For example, document page 800 is a document page which is input into common page memory area 801. Common page memory area 801 is a working memory area used by CPU 520 to store the page image of the scanned in document page (at area 801*a*) and to provide working storage area for block selection processing (at area 801*b*). In this regard, CPU 520 utilizes this area to store image data of a document page for processing as well as for storing intermediate block selection results. Memory area 803, comprised of a plurality of page memory sections, three of which are shown as 804, 805, and 806, stores a plurality of hierarchical tree structures, which result from block selection processing of image data in the document page 800. In this regard, since the hierarchical tree structure for each page is typically different (some pages are simple and some are complex), each of the trees ordinarily takes up a different amount of memory.

Upon initialization, both common page memory area 801 and hierarchical tree storage memory 803 are set to a fixed amount of memory space based on a predefined parameter set in the block selection application. It is to be noted that the user may change the predefined memory space allocated for common page memory 801 as well as for hierarchical tree storage memory 803 prior to performing block selection. In addition, memory might be allocated based on a fixed number of pages, such as 10, rather than being allocated to a fixed amount based on the predefined parameter.

After the memory has been allocated in step S605, flow advances to step S607 in which the user is queried as to the type of document which has been input. For example, the document image which is scanned in step S601 could be an English language document which would require horizontal processing, or a Japanese document which would require vertical processing. If the document contains both vertical and horizontal text, then mixed processing would be required. In any case, the user is provided with four choices, namely, unidirectional, vertical, horizontal, or mixed.

A "mixed" document type is the default type, which means that the user need not take any action if he is satisfied with the "mixed" choice for document type. Thus, in step S608, it is determined whether the user has input a non-default document-type. In the case that the user has input the document-type, the information is stored in the root node of the page. The document-type is used as a global parameter which, during the processing of the page, is essential for accurate results. For example, a horizontal setting will be utilized by an OCR program when performing optical character recognition on text data stored in the analyzed page.

If, in step S606, no setting has been input by the user, in step S611, the document type is set to the default setting. In the present invention, and as mentioned above, the default setting treats the input document page as a mixed document-type. Once again, the default setting is stored in the root node of the page and is used as a global parameter when processing the document.

Figure 1:
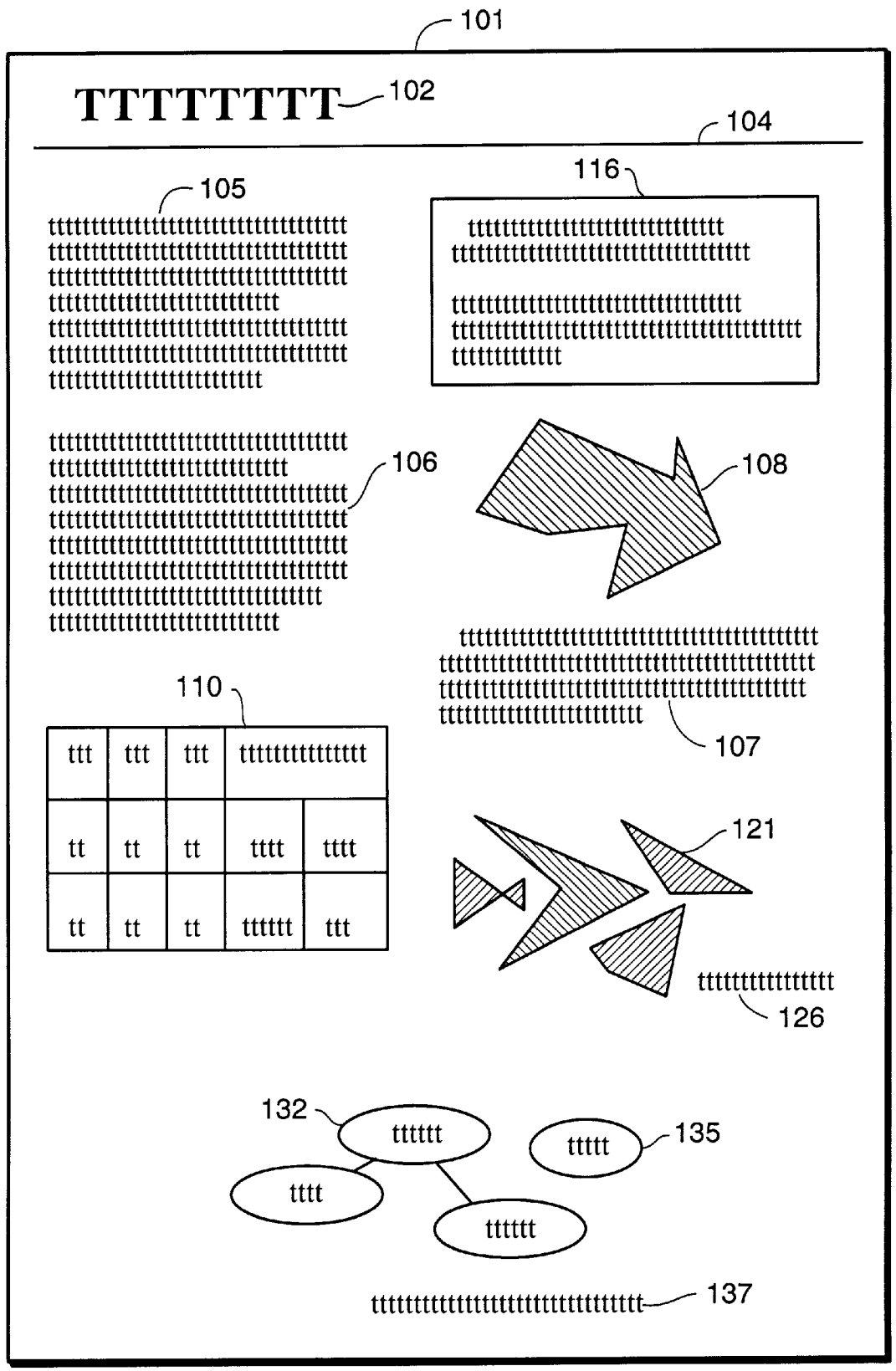
FIG. 1 is a representational view of a document page.
Figure 2:
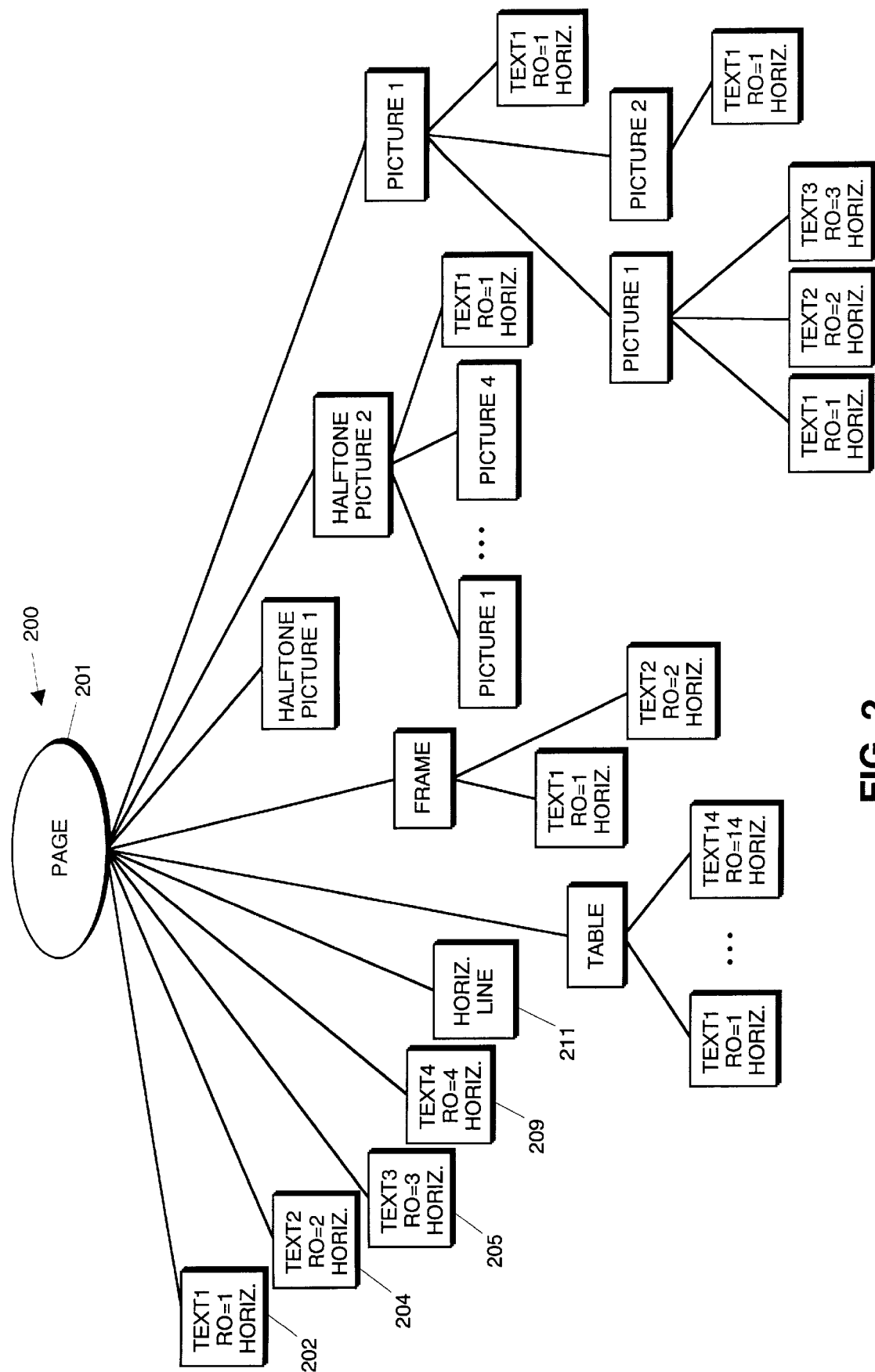
FIG. 2 is a representational view of a hierarchical tree structure resulting from a block selection operation on the document page illustrated in FIG. 1.

Once the document type has been set, flow advances to steps S615 through S635 in which block selection is performed. Briefly, and as described above, block selection works on a binary image of a document so as to identify the following different types of block units: (1) text including paragraph text, title text, text in a table, or caption text; (2) lines including horizontal lines, vertical lines, dotted lines and slanted lines; (3) joint lines which are line segments connected perpendicularly to each other; (4) images which could be halftone, continuous tone, grey scale or the like; (5) line art pictures; (6) a framing structure, such as a box-shaped line, in which each field of the frame is identified, such as the different fields in frame structure 116 of FIG. 1; (7) a table, such as table 110 in FIG. 1 in which each cell of the table is identified; and (8) white space which represents each independent field inside a frame or a line art picture.

Moreover, while conventional block selection and page segmentation techniques de-skew an image prior to block selection and page segmentation, the present invention saves skew detection for later steps whereby skew detection may be utilized for applying different processing steps on either skewed or upright document images. In the case of large skew angle, the block rectangles which enclose each of the blocks segmented out in steps S615 through S635 may look overlapped, but in fact when de-skewed, those rectangles are not overlapped. Moreover, by using rectangles in operating on skewed images, more information is provided for block image extraction.

Briefly, according to steps S615 through S635, a tree structure is used to represent a page image, the root node of the tree structure representing the page and all of the text and non-text blocks on the page being direct or indirect descendants of the root node. To select blocks on the page, connected components are searched for in the page image, and the connected components are classified into text or non-text units. The text and non-text connected components are then grouped to form cleaner and more compact block representations, whereby for example text connected components belonging to the same text paragraph are gathered to become a text block, and whereby for example connected components of one picture entity are gathered so as to become a picture block.

In more detail, in step S615, data image reduction may optionally be performed. Image reduction increases processing speed and is therefore desirable, but it also can have an adverse effect on ultimate OCR processing. Experimentally, it has been found that image connectivity is maintained when a four-for-one reduction approach is adopted for 200 dpi to 400 dpi document samples. Different reduction techniques may be applied to different image resolutions, and it has been found that image reduction yielding images of 50 to 75 dpi image resolution generates acceptable results both for speed and accuracy.

Figure 9A:
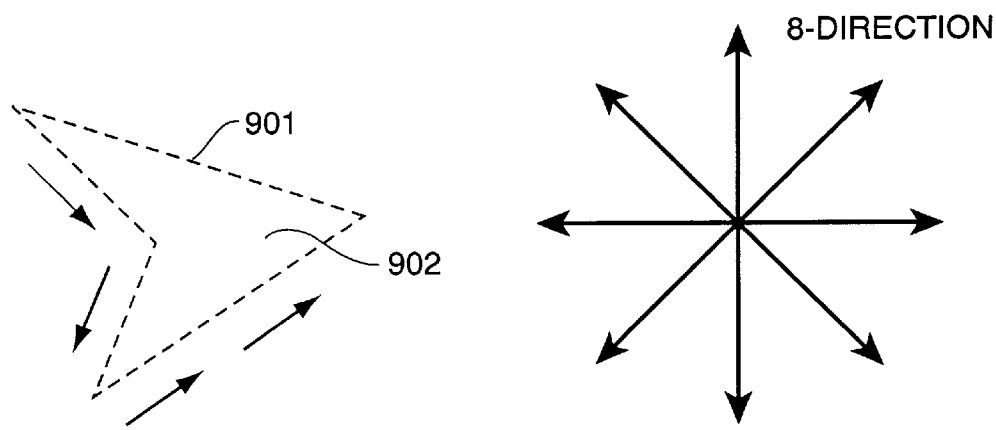
FIG. 9A is a view for explaining 8-direction tracing of the exterior of connected components.

In step S616 pixel data of the image is analyzed so as to detect connected components and so as to classify the connected components into text and non-text connected components based on their relative size and location. A connected component, as described in the aforementioned Ser. Nos. 07/873,012 and 08/171,720, is a group of black pixels that is completely surrounded by white pixels. Thus, connected component detection starts by searching the outline 901 of a connected component 902 in which the pixels which outline of the connected component are connected in any of the eight sector directions which are shown in FIG. 9A. Inner pixels of connected component 902 which are enclosed by outline 901 are skipped and analyzed later based on the result of text/non-text classification (step S618). Each connected component is then rectangularized by using the smallest rectangle circumscribing it.

Based on the size of the connected components and the fact that non-text objects are usually bigger than text objects, step S617 roughly classifies the connected components into text and non-text groups. Incorrect classifications are corrected in the following steps. The size threshold used for text and non-text classification is determined based on all connected components and is thus a global statistical value obtained from the connected components themselves. Separation in step S617 proceeds in two phases: first, extremely large connected components are filtered out and considered to be non-text components. Then, in the second phase, the average height and width of the remaining connected components are calculated. Based on these average values, a reasonable text size (i.e., a text size for a horizontal text case or a text width for a vertical text case) is computed and used as a threshold for further text/non-text separation.

Each of the text and non-text connected components obtained in step S617 is assigned a tree node located as a direct descendant of the page root node in the hierarchical tree. The text and non-text classification is made at each level of the tree according to the statistical values obtained from the connected components of the descendant level being processed. This distinction becomes important in later phases when there are more levels. For example, in a case where there are inconsistent text sizes inside and outside a frame block, since classification inside the frame block is carried out at a different descendant level from classification outside the frame block, classification both within and without the frame block works properly.

Figure 9B:
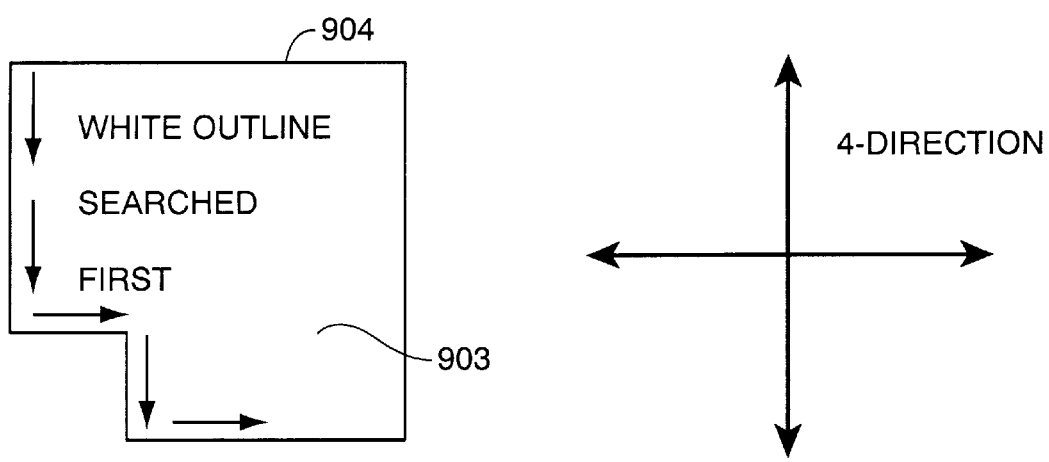
FIG. 9B is a view for explaining 4-direction tracing of interior white contours.

In step S618, non-text connected components are further analyzed to determine whether they are lines (horizontal, vertical, dotted or slanted), joint lines, pictures, line art, frame, table or unknown (i.e., none of the above). The connected components inside tables, frames and line art pictures are further searched and classified by repeating steps S617 and S618 at a deeper descendant level in the hierarchical tree. A hierarchical tree structure is therefore developed for each connected component and the objects that the connected component contains. However, in order to search internal connected components inside a frame or a table, eight-direction searching (as in FIG. 9A) of black pixels is not performed, but rather four-direction searching of white pixels is performed instead. This is illustrated in FIG. 9B in which a white contour 903 which is complete enclosed by black framing pixels 904 is searched based on four-direction searching. Four-direction searching of white contours has the advantage that internal connected components can be searched and classified.

Figure 10:
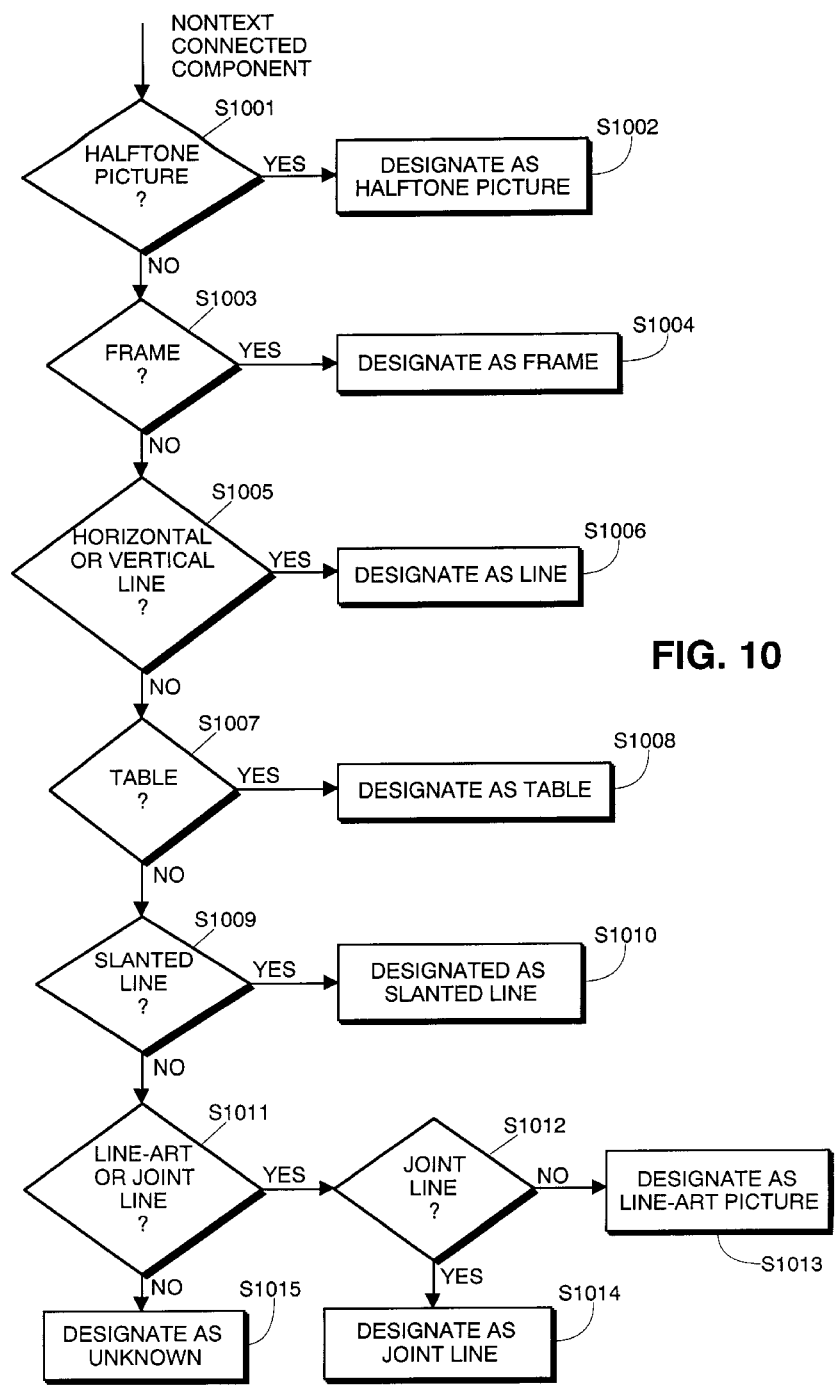
FIG. 10 is a flow diagram showing how non-text connected components are classified.

Non-text classification of step S618, since it results in a classification into lines, joint lines, frames, tables, pictures, line art and unknown, is best illustrated in a separate flow diagram which is given at FIG. 10. The processing shown in FIG. 10 is performed on each non-text connected component and is performed sequentially as shown in FIG. 10 such that, as soon as a type is determined for a non-text connected component, then no further processing in accordance with FIG. 10 is performed. Thus, if early on in processing of a particular non-text connected component in FIG. 10, it is determined that the non-text connected component is a halftone picture (for example), then no further processing in accordance with FIG. 10 is performed for that connected component, and processing then proceeds with the next non-text connected component.

Non-text classification, as illustrated in FIG. 10, is performed based on criteria thresholds which are formulated mathematically and calculated dynamically based on the size and width and the like of the objects being analyzed.

Thus, in step S1001, the non-text connected component is analyzed to determine if it is a halftone (or a continuous tone) picture. This determination is made based on a comparison of white and black pixel run lengths and black pixel density within the picture area. If the black pixel run length is much longer than white pixel run length inside the area, and the black pixel density is high or many noise-like connected components are located inside the area, then the non-text connected component is considered to be a halftone picture connected component, and flow advances to step S1002 which stores a "halftone picture" sub-attribute in the node for the connected component.

If the non-text connected component is not determined to be a halftone picture connected component, then flow advances to step S1003 in which a determination is made as to whether the non-text connected component is a frame. In frames, the height of the connected component is larger than the text size, and parallel horizontal edges and parallel vertical edges are straight enough and approximately close to the edges of the rectangle which circumscribe the unit so as to conclude that the connected component is a frame. Moreover, internal black pixel density is similar to or less than the density of a text paragraph (very high density connected components are determined to be picture components in step S1001). If the non-text connected component is designated as a frame, then flow advances to step S1004 which stores a "frame" sub-attribute in the node of the hierarchical tree that corresponds to this connected component.

If step S1003 did not determine that the non-text connected component was a frame, then step S1005 determines if the non-text connected component is a horizontal or vertical line. For horizontal and vertical lines, the ratio of width and height is large, and the thickness of the connected component is not much greater than the thickness of a text-size connected components on the same page and at the same hierarchical level. Furthermore, black pixel density inside the connected component is very dense. Both sides of the connected component should be straight, but if only one side is straight and the thickness of the connected component is similar to a text connected component, then it is considered that the connected component encapsulates underlined text. In this case, the attached text part and the line part are split from each other and analysis of steps S617 and S618 are re-performed. If the non-text connected component meets the criteria for a horizontal or vertical line, then it is so-designated in step S1006 by storing "horizontal line" or "vertical line" sub-attribute information in the hierarchical tree node.

If step S1005 did not determine that the non-text connected component was a vertical or a horizontal line, then step S1007 determines whether the non-text connected component is a table. To determine whether a non-text connected component is a table, internal white contours of the connected component are searched in four directions. If four internal white contours are found, and if the arrangement of the white contours is in a table-like grid such that the white contours are enclosed by horizontal and vertical lines, then the non-text connected component is designated as a table (step S1008) by storing a "table" sub-attribute in the hierarchical tree. In addition, the interior of the table is re-analyzed in accordance with steps S617 and S618 so as to identify and classify internal text and non-text connected components and add those connected components to the hierarchical tree.

If step S1007 did not determine that the non-text connected component was a table, then flow advances to step S1009 which determines whether the non-text connected component is a slanted line. For slanted lines, the ratio of length and thickness of the connected component is large, but the thickness of the connected component is no larger than a text size. Moreover, a black pixel density inside the connected component is high and the edges of the connected components are aligned by slanted. In the event that the non-text connected component is determined to meet these (criterion), then flow advances to step S1010 in which the non-text connected component is designated as a slant line by storing "slant line" sub-attribute information. Moreover, the slant angle of the slanted line is determined utilizing well-known angle-detection techniques, and the slant angle of the line is stored in the hierarchical node together with attribute information which can be used for post-processing purposes.

If step S1009 did not determine that a non-text connected component was a slanted line, then step S1011 determines whether the non-text connected component is a line art picture or a joint line. For line art pictures and joint lines, although the unit is larger than a predetermined size, like halftone pictures in step S1001, line art pictures are different than halftone pictures in that the continuous white-pixel run length is much longer than the continuous black-pixel run length inside the outline, and, in addition, black pixel density is low. If the non-text connected component meets this criteria, then processing proceeds to step S1012 to distinguish between a joint line and line art picture.

Figure 12A:
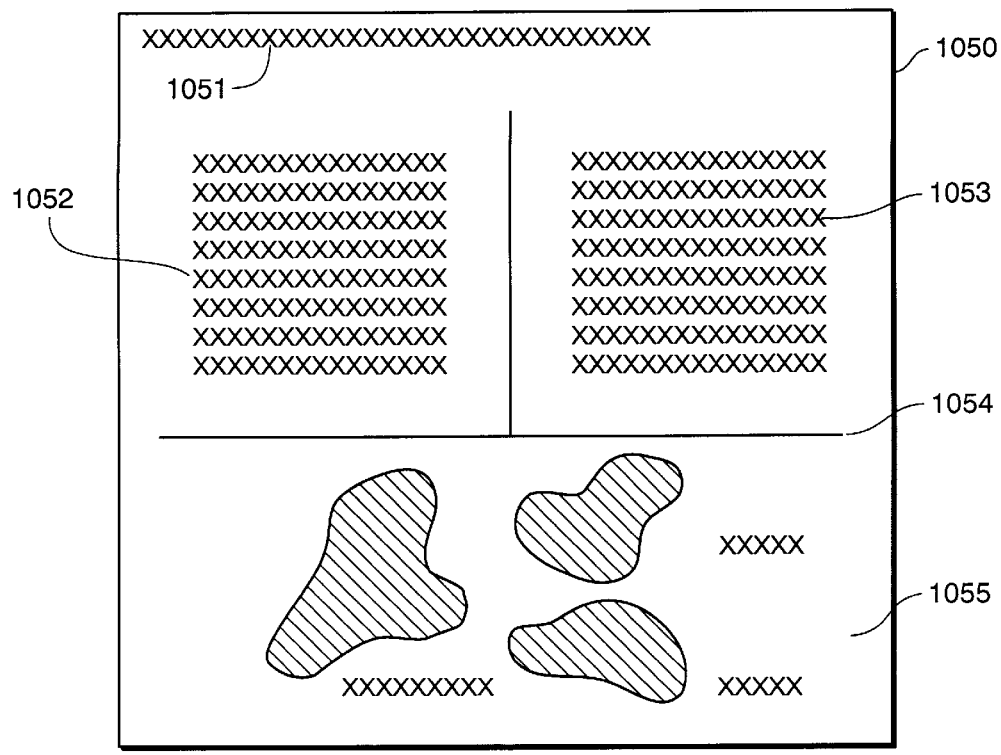
FIGS. 12A and 12B are representational views of a document page containing a joint-line.

FIG. 12A illustrates the difference between joint lines and line art pictures. In FIG. 12A, document page 1050 contains title 1051, text areas 1052 and 1053, and picture 1055. Text areas 1052 and 1053 are separated from each other and from picture 1055 by joint-line 1054. More generally, for joint lines, the following two groups of shapes are identified separately from each other, with those in group #1 being re-designated as a joint line, while those in group #2 being re-designated as a frame (i.e., if they were not already so-designated in step S1003). Detection is based on each element being long and thin, and each intersecting at right angles (horizontal mirror images, vertical mirror images, and diagonal mirror images are permitted):

group #1

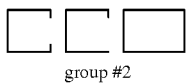

group #2

Accordingly, reverting to FIG. 12A, since joint-line 1054 matches group #1, above, flow advances to step S1014 where a joint-line sub-attribute is appended to its respective picture node.

On the other hand, for those non-text connected components which do not match group #1 (for which a joint line attribute is attached) or group #2 (for which a frame attribute is attached), then flow advances to step S1013 where the connected component is designated as a line art picture and, in addition, "line art picture" sub-attribute information is stored in the hierarchical tree node.

Figure 12B:
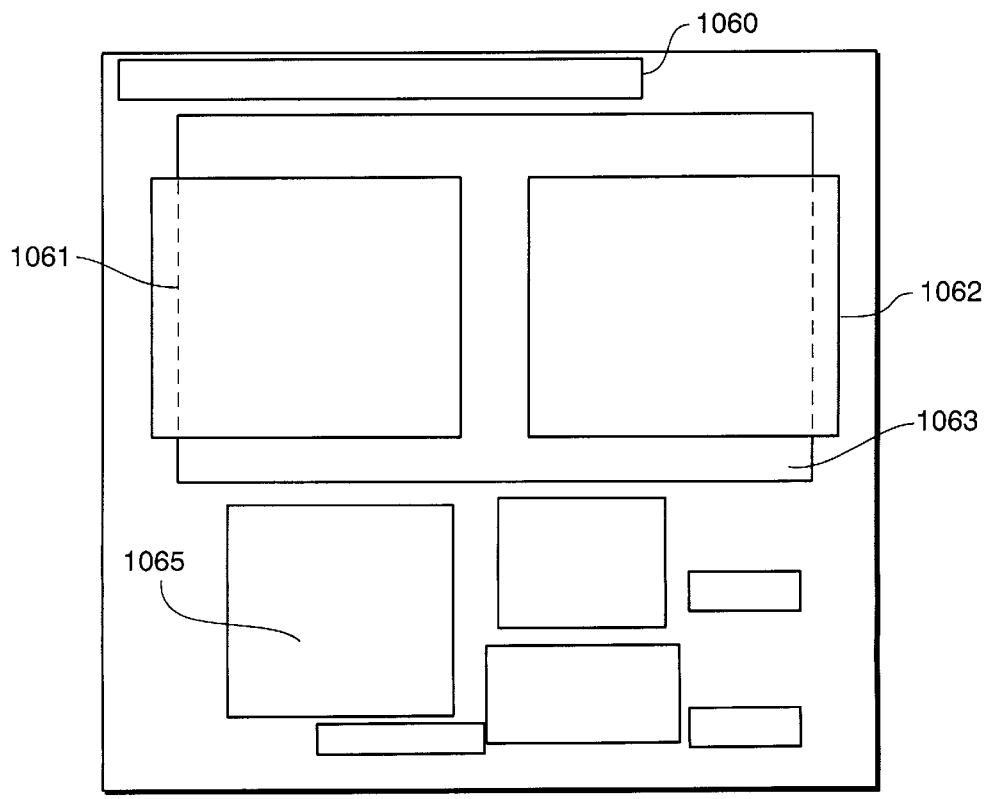

FIG. 12B is included to illustrate how the various image data in FIG. 12A is designated and separated using the block selection application of the present invention. In FIG. 12B, title 1051, text areas 1052 and 1053, and picture 1055 are represented by blocks 1060, 1061, 1062 and 1065, respectively. Joint-line 1054 is represented by block 1063 which overlaps text blocks 1061 and 1062. The coordinates and attributes of each block is stored in corresponding nodes in the hierarchical tree so that selected image data can be extracted for further processing.

Reverting to FIG. 10, if step S1011 did not determine that the non-text connected component was a line art picture or a joint line, then flow advances to step S1015 in which the non-text connected component is designated as an unknown type, and "unknown" is stored as sub-attribute information in the hierarchical tree node.

Reverting to FIG. 6, after non-text connected components are classified in step S618, flow advances to step S619 in which dotted lines are detected. Dotted lines are generally difficult to detect since each dot in a dotted line forms a separate connected component. These connected components are all sized approximately the same as a text connected component. Accordingly to detect dotted lines, text connected components having small horizontal or vertical size which is similar to a dot size are all collected. Those collected components are divided into different groups based on the relative distances between them. Each group is then checked to see if it can be qualified to be a broken vertical, horizontal, or slanted dotted line based on the size and surrounding line of neighbors. For each detected dotted line, a connected component with an outline enclosing all of the dotted line elements is created artificially and is used to represent a new unit which is given an attribute in the hierarchical tree as a dotted horizontal, vertical or slanted line.

Joint dotted lines can also be detected in step S619. More specifically, if the grouped connected components are comprised by dotted horizontal and dotted vertical lines that intersect or nearly intersect perpendicularly, then the group is designated as a joint dotted line, and the hierarchical tree node corresponding to the artificially created outline is stored with a "joint dotted line" attribute.

Flow then advances to step S620 in which invisible lines are searched along the edge of non-text connected components. Invisible lines, such as the white space between columns, are used so as to assist in determining whether adjacent text connected components should be grouped together or in separate columnar blocks.

Flow then advances to step S621 in which, for documents having a "unidirectional" direction type stored from steps S607 through S611, the page direction is determined (step S621a). The determination of page direction depends on the size of connected components on the page plus size variation among the connected components. For example, connected components of a horizontal-direction page have a more uniform height than width, whereas the connected components of a vertical-direction page have a more uniform width than height. In addition, horizontal and vertical gap number and size are additional factors considered in determining page direction.

Whatever direction is detected in Step S621a is stored in the root node of the page because, for unidirectional documents, the direction is a global parameter.

In step S622, any non-text connected components that could not be classified in step S618 (i.e., all non-text connected components having an "unknown" type) are further analyzed to determine if they might in fact be part of a larger-font-size title line. Title lines are formed in either a horizontal or a vertical direction by grouping unknown connected components with adjacent text or unknown units. Title grouping direction is determined based on the distance between those connected components considered to be grouped and possible title line length.

Flow then advances to step S623 in which text blocks are formed. In this step, no skew detection or image rotation is performed prior to forming the text or non-text blocks. This results in considerable time savings by avoiding unnecessary image rotation and also avoids inaccuracies (which may cause failures in OCR processings) caused by skew detection and de-skewing. Moreover, it is possible that some areas of the same page are edited in a slanted way to achieve some special visual effects whereas the remaining areas of the page are not so slanted. Skew detection may therefore not be useful to correct the page into an upright form since no one skew angle will be effective to de-skew the entire page. Therefore, in this step S621, text and non-text blocks are formed directly regardless of skew.

More particularly, for each text connected component, close horizontal and vertical neighbors are searched and aggregated into text blocks. Thresholds for judging closeness between text connected components are based on a statistical analysis of horizontal and vertical gaps between neighboring text units on this same hierarchical tree level. Therefore, the definition of closeness is dynamically determined based on the document and the page area.

Flow then advances to step S624 in which text blocks which have inadvertently been aggregated in step S623 are split if some visible or invisible line passes through it. Specifically, an invisible line detected in step S620 may be caused by the existence of extremely narrow column gaps in the page, such as a gap which occurs when a picture area is followed closely by a text paragraph. In such a case, there will not be a visible line separator between the text and the non-text block, but the invisible line detected in step S620 provides a suitable separator. Of course, the existence of physical separators, in the form of horizontal or vertical or slanted lines, is also applied to split inadvertently aggregated blocks in this step S624.

Flow then advances to step S625 which, for documents having a "mixed" direction type stored from steps S607 through S611, detects the direction of each text block. Specifically, for document types designated as "mixed", each text block is analyzed in step S625a to determine whether it is vertical, horizontal or an unknown direction. This direction (or the direction determined in step S621a or entered by the user in step S609) is used in the following step so as to form text lines within each text block. In addition, the direction of text blocks is useful for judging if two neighboring text blocks can be combined. For example, if the text directions of the two blocks are inconsistent, then they ordinarily should not be combined.

The determination of text block direction depends on the size of the block and the size of connected components inside the block plus size variation among the connected components. For example, connected components of a horizontal-direction text block have a more uniform height than width, whereas the connected components of a vertical-direction text block have a more uniform width than height. In addition, horizontal and vertical gap number and size are additional factors considered in determining text block direction.

Flow then advances to step S626 which forms text lines inside each text block. If the text direction is horizontal, connected components which have close horizontal distances and a certain degree of overlap with neighboring components along the vertical position are gathered into horizontal text lines. Similarly, if text direction is determined to be vertical, connected components which have close vertical distance and a certain degree of overlap with neighboring components along the horizontal position are gathered into vertical text lines. Formation of text lines considers not only upright pages, but also pages with some skew angle.

Flow then advances to step S627 in which skew is detected. Skew of the entire page is calculated using a least-squares approach to measure the skew of each of the text lines formed in step S626. The page skew is then the average, in the least-squares sense, of the skew angles of the text lines on the page.

The skew angle calculated in step S627 is stored as a global parameter in the root node of the hierarchical tree for the document page. Like the document type stored in steps S607 through S611, the skew angle is used as a global parameter when performing, for example, OCR processing or other types of processing which requires this information so as to process the image data properly.

Flow then advances to step S628 which determines whether the skew angle exceeds a predefined maximum angle. More specifically, in step S628, the skew angle is compared to a predefined maximum angle set in the block selection application. If the skew angle exceeds the predefined maximum angle, then in step S628a, the block selection application outputs an error code which signals to the user that the page is too skewed to complete block selection.

Flow then advances to step S629 in which post-processing is performed. Post-processing is designed mostly to make block representation more compact and cleaner. Also, post-processing could be tailored to suit a particular follow-up work such as character recognition, data compression, and the like. Mostly, in post-processing, text blocks are combined with other text or non-text blocks, and text blocks are also combined with other non-text or text blocks.

Post-processing procedures are applied based on the page skew obtained in step S627. If the page is only minimally skewed such that column gaps are still clear, then blocks are combined aggressively. On the other hand, if the page has a larger skew and rectangular areas of many of the blocks are overlapped, then blocks are combined more conservatively. Specifically, for pages with smaller skew, text blocks are combined according to column information analyzed based on text blocks around the local area. Combination of text blocks basically depends on whether the text blocks are within the same column, if they are close to each other, if their directions are consistent, and if their combination would cause overlap with other blocks. Combination of non-text blocks is based on the principle that some separated non-text pieces should have been included within the non-text entity. For example, some picture objects may actually be formed of several unconnected pieces. Once those unconnected pieces are judged to be the same picture, then a new composite region, which is represented by a dummy node in the hierarchical tree, is created so as to cover all of those pieces. Moreover, if some text is determined to be associated with a picture object, such as a caption, then a composite region is designated, in which case a dummy node in the hierarchical tree is used to cover both the picture and the text part. Composite region processing is discussed in further detail below in connection with step S634.

Once post-processing has been performed, a first block of information is selected for special processing in accordance with whether the block is a text block, line block, picture block, a frame block, non-text block, a composite region block, or a table block. In the presently preferred embodiment, special processing is needed only for pictures or composite regions, and other blocks are therefore not specially-processed. For those blocks, block selection is complete. The special processing for pictures and for composite regions is as follows.

Figure 11:
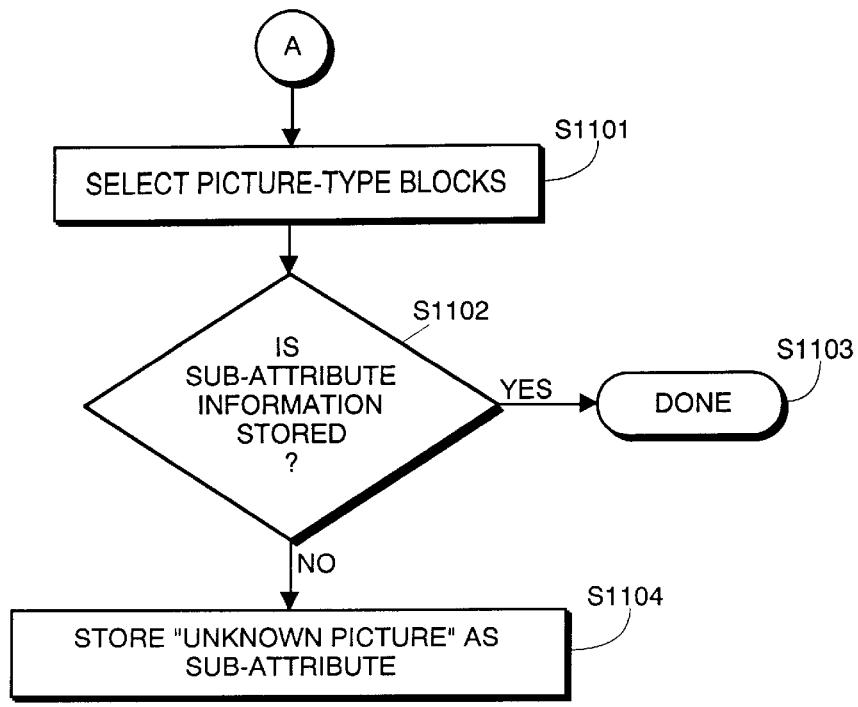
FIG. 11 is a flow chart describing the method of checking the picture-type of picture blocks.

FIG. 11 is a detailed flow diagram showing special processing in the event that image data is designated and identified as picture image information (step S632). That is, when block selection identifies image data as picture image information, it tries to identify the type of picture information such as halftone, line drawing, joint line, etc. For those picture blocks which cannot be so-identified, special processing of FIG. 11 designates them as "unknown pictures".

Thus, in step S1101, picture-type blocks are selected for special processing. In step S1102, if sub-attribute information is already stored, then special processing for the selected picture-type block is done (step S1102). Thus, if a sub-attribute information of "halftone" or "line art" or "joint line" is already stored (i.e., from the processing shown in FIG. 10), then special processing for this picture-type block is complete.

On the other hand, if the image data has not been identified as a halftone image, a line drawing, or a joint-line, then the picture-type block is identified as unknown and an "unknown" sub-attribute is appended to the picture node (step S1104). In step S1104, the processing of the picture image data is terminated.

Figure 13:
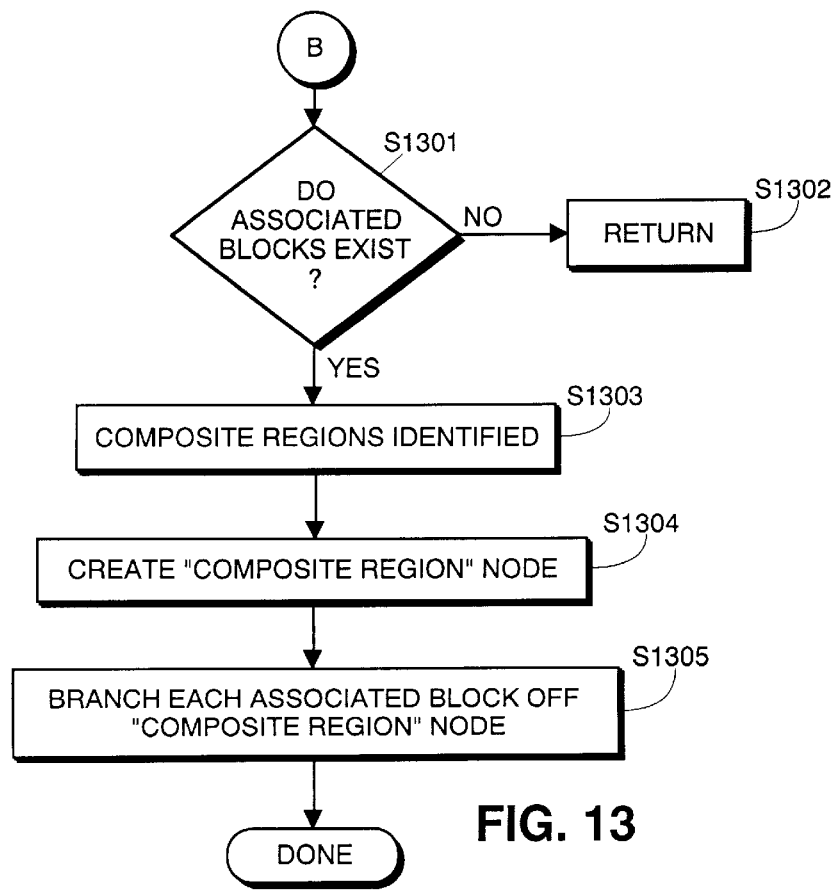
FIG. 13 is a flow chart describing the method of processing composite regions.

FIG. 13 is a detailed flow diagram showing special processing in the event that image data within a block is determined to be a composite region which includes more than one image type (step S634). That is, block selection identifies a block of image data which contains more than one image data type. According to the present invention, process steps of block selection are applied to composite regions in order to identify the types of image data therein.

Figure 14A:
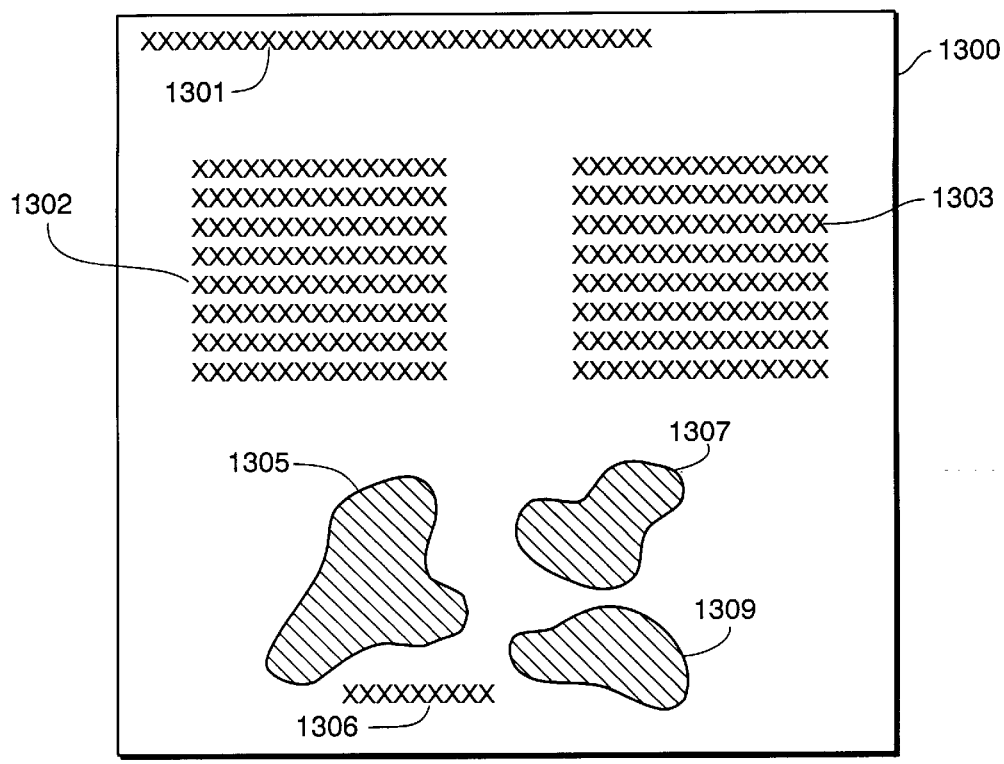
FIGS. 14A and 14B are representational views of a document page containing a composite region.
Figure 15A:
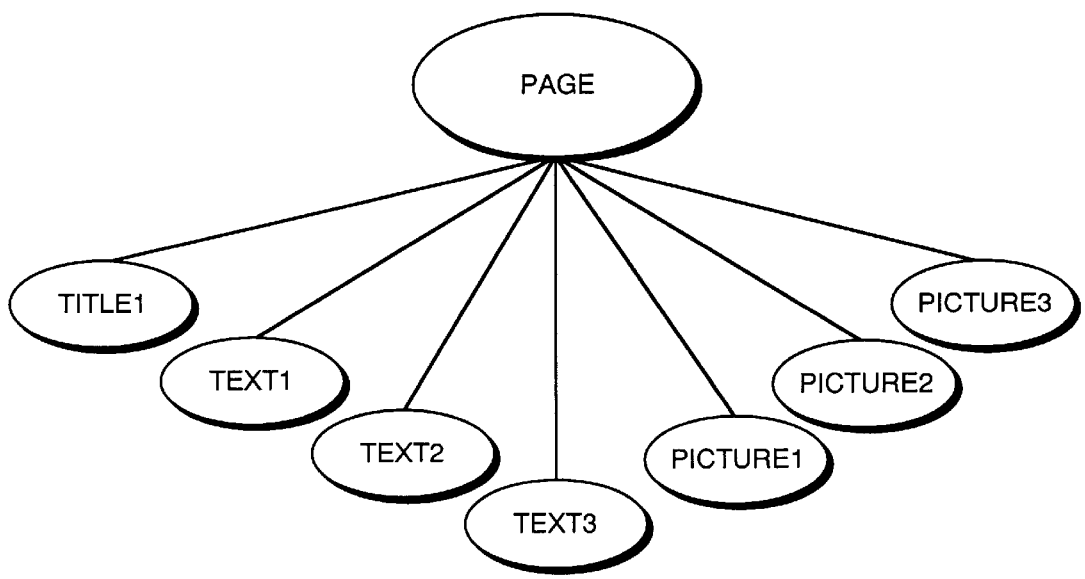
FIGS. 15A and 15B are views showing hierarchical tree structures of the document page shown in FIGS. 14A and 14B.

Thus, in step S1301, a determination is made as to whether blocks exist which have associated images therein. For example, as shown in FIG. 14A, document page 1300 includes title 1301, text areas 1302 and 1303, and picture areas 1305, 1307 and 1309. In the example shown in FIG. 14A, a text caption 1306 is also included. Block selection will have created a separate block for each of those regions, resulting in the hierarchical structure shown in FIG. 15A.

Figure 14B:
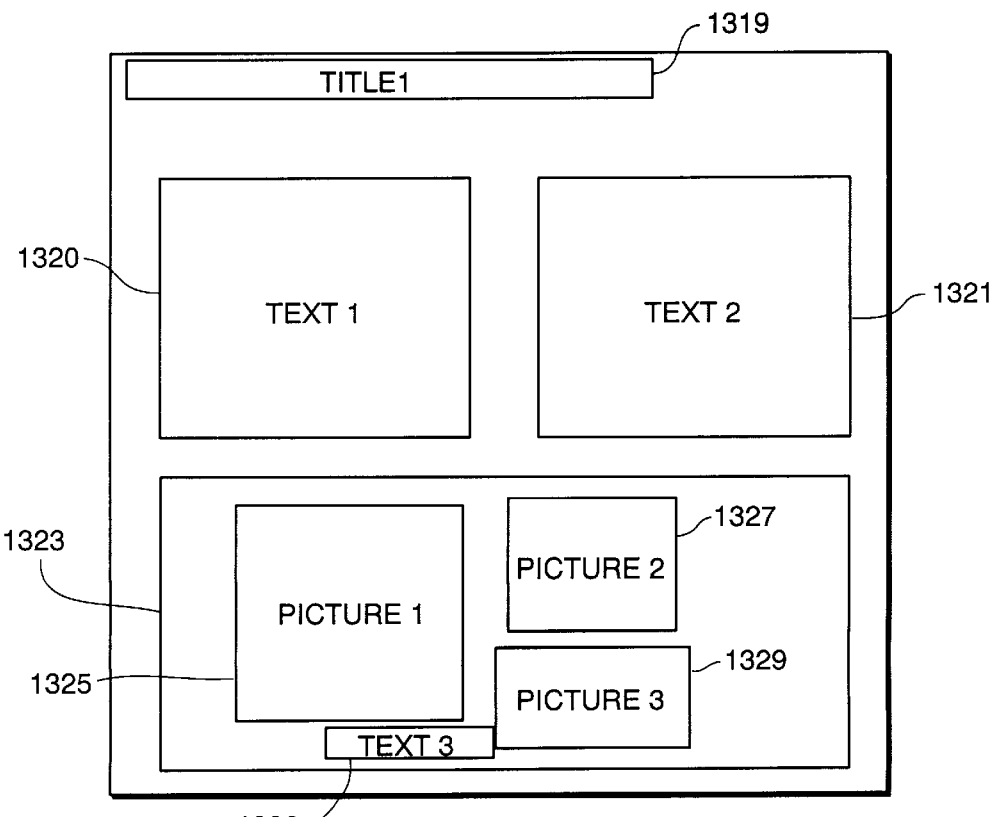

As shown in FIG. 14B, title 1300 and text areas 1302 and 1303 are treated as individual blocks 1319, 1320 and 1321, respectively. However, picture areas 1305, 1307 and 1309 together with text caption 1306 are grouped together as a "composite region" 1323, that is, a region containing more than one image.

More generally, composite regions may also include blocks which have the same attribute but which have inadvertently been split into plural blocks. For example, a picture containing unconnected picture pieces would ordinarily be split by block selection into separate picture blocks. Composite region processing will create a "dummy" hierarchical node to contain each of those picture pieces as one block.

If in step S1301, it is determined that associated blocks do not exist then flow returns to step S1302. However, if associated blocks are identified, then flow proceeds to step S1303 in which the block is identified as a "composite region" and a composite region node is appended in the hierarchical tree node (step S1304).

Figure 15B:
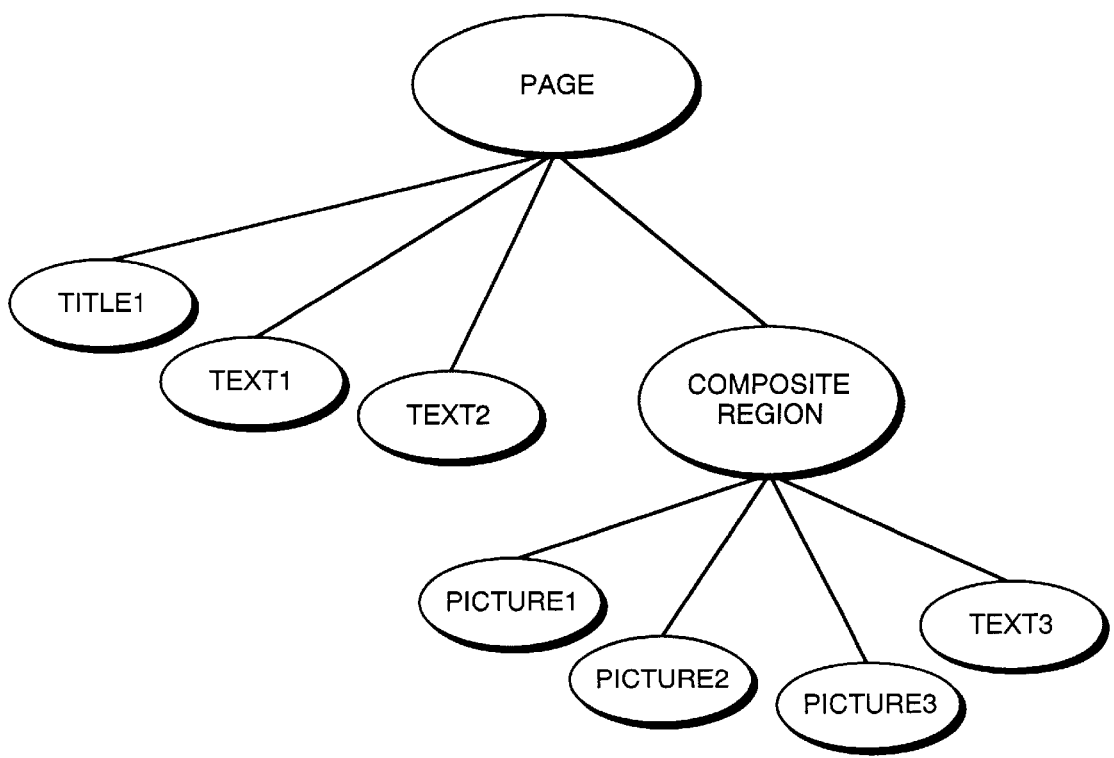

In step S1305, for each associated block, the location of its hierarchical tree node is changed so that it descends form the "composite region" node. This is shown in FIG. 15B in which nodes for pictures 1305, 1307 and 1309 and the node for text 1306 are caused to branch from composite region node 1323.

Reverting to FIG. 6C, once the hierarchical tree has been created for the page, in step S640, the resulting hierarchical tree structure is stored in the memory space allocated in step S605 for hierarchical tree storage. In this regard, although a rectangle is the simplest way to describe each block, sometimes the block may not exist in an isolated rectangular area, and overlapping may occur for the block rectangles. Overlapping may confuse the block image extraction operations. Accordingly, in addition to using rectangles, other representations are also provided to describe each block, and users can extract the correct block directly from the representation. The other representations originate from the connected component outline search, but the outline data is simplified to be a series of outline pairs or further to be a series of non-overlapping rectangles for each block. An artificial outline is created to cover all of the connected components in case more than one connected component is included in the block. This means that each block could be represented simply by a series of outline pairs or a series of non-overlapping rectangles. Based on the simplified representation, the block image can be directly extracted from the region of each outline pair or rectangle.

In step S641, the block selection program queries the user if more pages are to be analyzed. If no further pages are to be entered, then in step S642, the block selection application is terminated. However, if the user indicates that more pages are to be analyzed, step S643 determines whether there is enough hierarchical tree storage remaining in the allocated memory area.

If sufficient memory is remaining in the hierarchical tree storage, then flow returns to step S603. However, if no additional hierarchical tree storage space remains in the allocated memory area, an error code is returned to the user in step S646. At this point, either the block selection application will automatically terminate, or the user can reallocate the memory space for storing additional hierarchical tree structures.

Possible Applications

Optical character recognition (OCR) is not the only application which needs to collect text blocks as output by block selection described above. Other applications which need document image manipulation purposes can also use block selection, such as document storage and transmission, form identification and processing, document understanding, and document retrieval.

For example, using block selection, different image compression methods could be used to store and transmit page images more efficiently. Thus, text blocks could be stored by binary compression and picture blocks can be stored by multi-level picture compressions.

For form identification and processing, block selection can be utilized to avoid the need for placing special marks on each form so as to distinguish one form from another. Using block selection, form identification and processing can proceed in more general ways such that each form, after block selection, will be represented by a hierarchical tree structure which can be identified based on comparison with a dictionary of hierarchical tree structures for blank forms.

Document understanding provides logical analysis for the document. Basically, document understanding labels a page image according to predetermined layout conventions. Due to hierarchical characteristics of block selection, structural fundamentals of the document can be obtained so as to assist in the physical analysis of pages.

Figure 3:
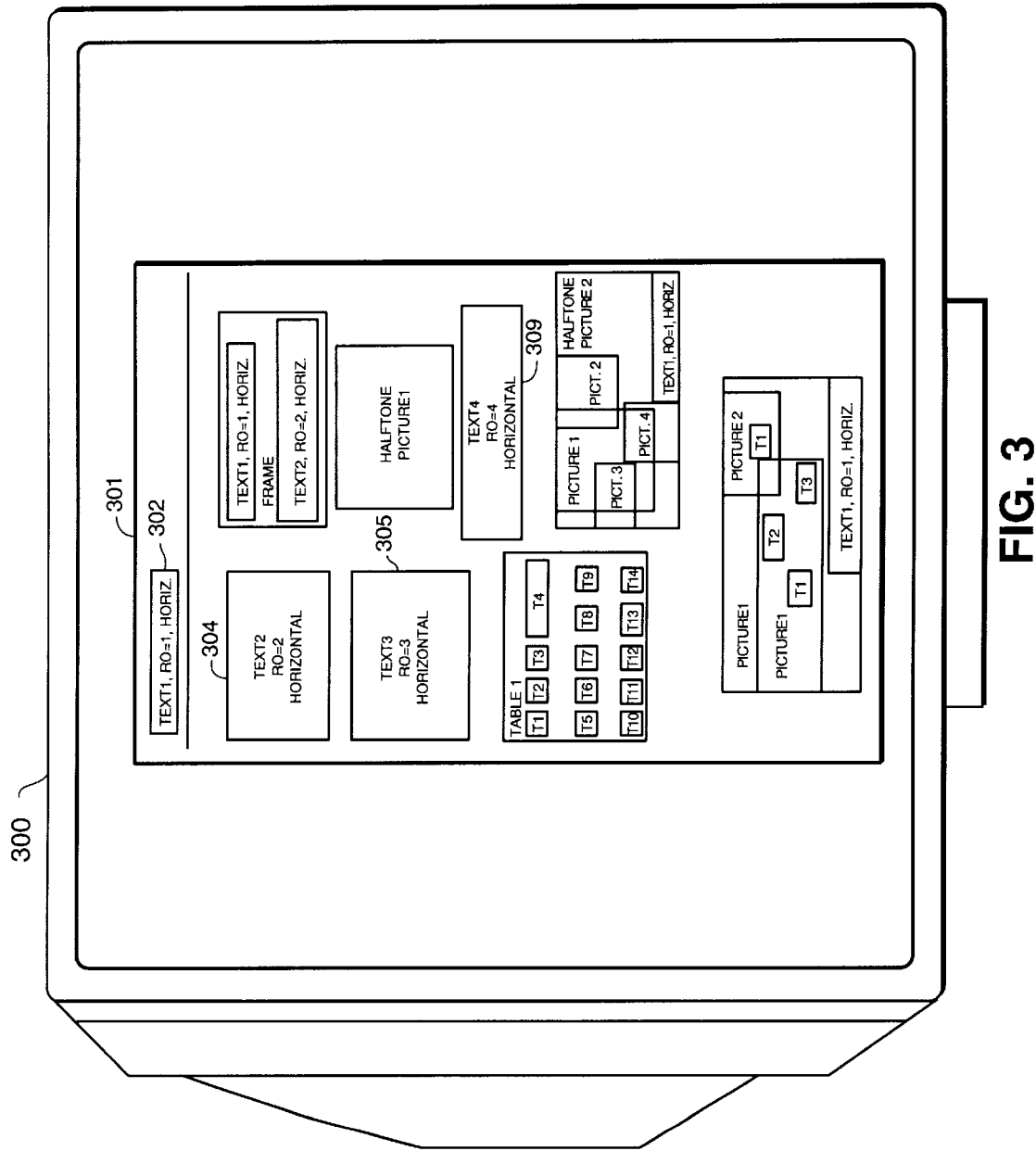
FIG. 3 is a view showing how the document page which is created based on the hierarchical tree structure shown in FIG. 2 might be displayed on a display screen.

Document retrieval and storage can also make great use of block selection described above. For example, using block selection, a page image can be represented in block format, as shown above in FIG. 3 in which blocks are displayed to the user rather than the document itself. As a user glances through the block format of the document, the user may receive layout information which provides visual clues as to whether the document being viewed is the document desired. Then, a user would be able to obtain information from certain text or non-text blocks based on the predetermined document format and some other specific requests. For example, consider a standard business memo which includes, as shown in FIG. 16, a "To:" field, a "From:" field, a "cc:" (carbon copy) field, and the body of the memo. When viewing this business memo in the block-oriented format shown in FIG. 3, a user may request specific information based on location, such as "the third line" to indicate the "cc:" field. The manner in which specific fields of information are obtained are varied. For example, a user may instead specify "the last text line above the horizontal line located in the upper page half" which would also specify the same "cc:" field. Once the user's specification is properly interpreted, then the area in which the user is interested can automatically be extracted.

The invention has been described with respect to a particular illustrative embodiment. It is to be understood that the invention is not limited to the above described embodiment and that various changes and modifications may be made by those of ordinary skill in the art without departing from the spirit and scope of the appended claims.

What is claimed is:

1. In a page analysis system for analyzing image data in a document page, a method for selecting one of a plurality of portions of the document page to be analyzed, comprising the steps of:

inputting image data of a document page;

displaying the document page utilizing the input image data;

designating coordinates, using a coordinate designating device, of the one portion of the document page to be analyzed;

extracting image data of the portion of the document page designated in the designating step; and performing block selection on the portion in order to analyze the extracted image data of the portion.

2. In a page analysis system for analyzing image data in the document page, an apparatus for selecting one of a plurality of portions of the document page to be analyzed, comprising:

inputting means for inputting image data of a document page;

displaying means for displaying the document page utilizing the input image data;

a coordinate designating device for designating coordinates of the portion of the document page to be analyzed;

image data extracting means for extracting image data of the portion of the document page designated by the coordinate designating device; and block selection means for performing block selection on the portion in order to analyze the extracted image data of the portion.

3. For use in a page analysis system for analyzing image data in a document page, a computer-readable medium storing computer-executable process steps to select one of a plurality of portions of the document page to be analyzed, the process steps comprising:

an inputting step to input image data of a document page;

a displaying step to display the document page utilizing the input image data;

a designating step to designate coordinates, using a coordinate designating device, of the one portion of the document page to be analyzed;

an extracting step to extract image data of the portion of the document page designated in the designating step; and a performing step to perform block selection on the portion in order to analyze the extracted image data of the portion.

4. In a page analysis system for analyzing image data in a multi-page document, wherein a hierarchical tree structure of the analyzed pages is created utilizing a block selection program, and wherein the hierarchical tree structure includes a root node, a method for defining a composite region of image data in a page of the multi-page document, comprising the steps of:

inputting image data of a page of a multi-page document;

performing block selection processing so as to identify and separate the image data into blocks having the same image type;

identifying at least one block of image data which has an association to another separate block of image data, the associated blocks represented by nodes in the hierarchical tree structure;

combining said associated blocks of image data within a composite block; and adding a node representing the composite block to the hierarchical tree structure, the node representing the composite block added such that the nodes representing the associated blocks descend from the node representing the composite block.

5. In a page analysis system for analyzing image data in a multi-page document, wherein a hierarchical tree structure is created for the analyzed pages, and wherein the hierarchical tree structure includes a root node, an apparatus for defining a composite region of image data in a page of the multi-page document;

block selection processing means for identifying and separating the image data into blocks having the same image type;

identifying means for identifying at least one block of image data which has an association to another separate block of image data, the associated blocks represented by nodes in the hierarchical tree structure;

combining means for combining said associated blocks of image data within a composite block; and modifying means for modifying the hierarchical tree by adding a node representing the composite block, the node representing the composite block added such that the nodes representing the associated blocks descend from the node representing the composite block.

6. For use in a page analysis system for analyzing image data in a multi-page document, wherein a hierarchical tree structure of the analyzed pages is created utilizing a block selection program, and wherein the hierarchical tree structure includes a root node, a computer-readable medium storing computer-executable process steps to define a composite region of image data in a page of the multi-page document, the process steps comprising:

an inputting step to input image data of a page of a multi-page document;

a performing step to perform block selection processing so as to identify and separate the image data into blocks having the same image type;

an identifying step to identify at least one block of image data which has an association to another separate block of image data, the associated blocks represented by nodes in the hierarchical tree structure;

a combining step to combine said associated blocks of image data within a composite block; and an adding step to add a node representing the composite block to the hierarchical tree structure, the node representing the composite block added such that the nodes representing the associated blocks descend from the node representing the composite block.

7. In a page analysis system which creates a hierarchical tree structure corresponding to a block template of a document image wherein the hierarchical tree structure includes a plurality of nodes each of which represents a block of image data in the block template of a document image and contains feature data defining features of the block template of a document image, a method of identifying and indicating a picture type, the method comprising steps of:

inputting image data of a page of a multi-page document;

performing block selection processing so as to identify and separate the image data into blocks having the same image type;

identifying blocks of image data which contain picture information;

storing information in nodes corresponding to the blocks of picture information, the information indicating that the blocks contain picture information;

determining a type of picture information within a block of picture information, wherein, in the determining step, it is determined whether or not picture information is half-tone, line-drawing, joint-line, or unknown; and storing, in a node representing the block of picture information in the hierarchical tree, information indicating the type of picture determined in the determining step.

8. In a page analysis system which creates a hierarchical tree structure corresponding to a block template of a document image wherein the hierarchical tree structure includes a plurality of nodes each of which represents a block image data in the block template of a document image and contains feature data defining features of the block template of a document image, an apparatus for identifying and indicating a picture type, comprising:

input means for inputting image data of a page of a multi-page document;

block selection processing means for identifying and separating the image data into blocks having the same image type;

identifying means for identifying blocks of image data which contain picture information;

determining means for determining a type of picture information within the block of picture information, wherein said determining means determines whether or not picture information is half-tone, line-drawing, joint-line, or unknown; and storing means for storing, in a node representing the block of picture information in the hierarchical tree, the type of picture determined by said determining means.

9. For use in a page analysis system which creates a hierarchical tree structure corresponding to a block template of a document image wherein the hierarchical tree structure includes a plurality of nodes each of which represents a block of image data in the block template of a document image and contains feature data defining features of the block template of a document image, a computer-readable medium storing computer-executable process steps to identify and to indicate a picture type, the process steps comprising:

an inputting step to input image data of a page of a multi-page document;

a performing step to perform block selection processing so as to identify and separate the image data into blocks having the same image type;

an identifying step to identify blocks of image data which contain picture information;

a storing step to store information in nodes corresponding to the blocks of picture information, the information indicating that the blocks contain picture information;

a determining step to determine a type of picture information within a block of picture information, wherein, in the determining step, it is determined whether or not picture information is half-tone, line-drawing, joint-line, or unknown; and a storing step to store, in a node representing the block of picture information in the hierarchical tree, information indicating the type of picture determined in the determining step.

\* \* \* \* \*